US008599397B2

(12) United States Patent
Ikeda et al.

(10) Patent No.: US 8,599,397 B2
(45) Date of Patent: Dec. 3, 2013

(54) ACCESS CONTROL SYSTEM, APPARATUS, AND PROGRAM

(71) Applicants: Kabushiki Kaisha Toshiba, Minato-ku (JP); Toshiba Solutions Corporation, Minato-ku (JP)

(72) Inventors: Tatsuro Ikeda, Fuchu (JP); Shingo Miyazaki, Fuchu (JP); Tomoaki Morijiri, Chofu (JP); Minoru Nishizawa, Fuchu (JP); Kazuya Hashimoto, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 0 days.

(21) Appl. No.: 13/873,696

(22) Filed: Apr. 30, 2013

(65) Prior Publication Data

US 2013/0250335 A1 Sep. 26, 2013

Related U.S. Application Data

(63) Continuation of application No. 13/416,133, filed on Mar. 9, 2012, now Pat. No. 8,456,659, which is a continuation of application No. PCT/JP2010/063704, filed on Aug. 12, 2010.

(30) Foreign Application Priority Data

Sep. 9, 2009 (JP) ................................ 2009-208312

(51) Int. Cl.
*G06F 3/12* (2006.01)
*G06K 15/00* (2006.01)

(52) U.S. Cl.
USPC .......... 358/1.13; 358/1.1; 358/1.14; 358/1.15

(58) Field of Classification Search
None
See application file for complete search history.

(56) References Cited

U.S. PATENT DOCUMENTS

| | | | | |
|---|---|---|---|---|
| 8,302,205 | B2 * | 10/2012 | Kanai | 726/27 |
| 2005/0021980 | A1 * | 1/2005 | Kanai | 713/182 |
| 2009/0083831 | A1 * | 3/2009 | Kanai | 726/1 |
| 2012/0237041 | A1 * | 9/2012 | Pohle | 381/56 |

FOREIGN PATENT DOCUMENTS

JP 2001-092880 4/2001

(Continued)

OTHER PUBLICATIONS

Written Opinion of the International Searching Authority Issued Sep. 14, 2010 in PCT/JP2010/063704 (English translation only).
International Preliminary Report on Patentability Issued Apr. 19, 2012 in PCT/JP2010/063704.

(Continued)

*Primary Examiner* — Vincent Rudolph
*Assistant Examiner* — Marcus T Riley
(74) *Attorney, Agent, or Firm* — Oblon, Spivak, McClelland, Maier & Neustadt, L.L.P.

(57) ABSTRACT

According to one embodiment, a deriving operation control device obtains derivation control information and a derivation attribute. A deriving operation propriety determination unit extracts the number of times of previously-performed derivation from the derivation attribute. The deriving operation propriety determination unit extracts the upper limit number of times enabling derivation from the derivation control information and determines that a deriving operation is possible when the number of times of previously-performed derivation is equal to or below the upper limit number of times enabling derivation. A deriving operation execution unit executes the deriving operation.

1 Claim, 19 Drawing Sheets

(56) References Cited

FOREIGN PATENT DOCUMENTS

| | | |
|---|---|---|
| JP | 2001-306521 | 11/2001 |
| JP | 2001-350759 | 12/2001 |
| JP | 2002-042413 | 2/2002 |
| JP | 2006-309282 | 11/2006 |
| JP | 2009-65592 | 3/2009 |
| JP | 2009-100225 | 5/2009 |
| JP | 2009-187374 | 8/2009 |

OTHER PUBLICATIONS

International Search Report issued Sep. 14, 2010, in PCT/JP2010/063704 filed Aug. 12, 2010 (with English Translation).

International Written Report issued Sep. 14, 2010, in PCT/JP2010/063704 filed Aug. 12, 2010.

Tim Moses, "eXtensible Access Control Markup Language (XACML) Version 2.0", URL: http://docs.oasis-open.org/xacml/2.0/access control-xacml-2.0-core-spec-os.pdf., Feb. 2005.

* cited by examiner

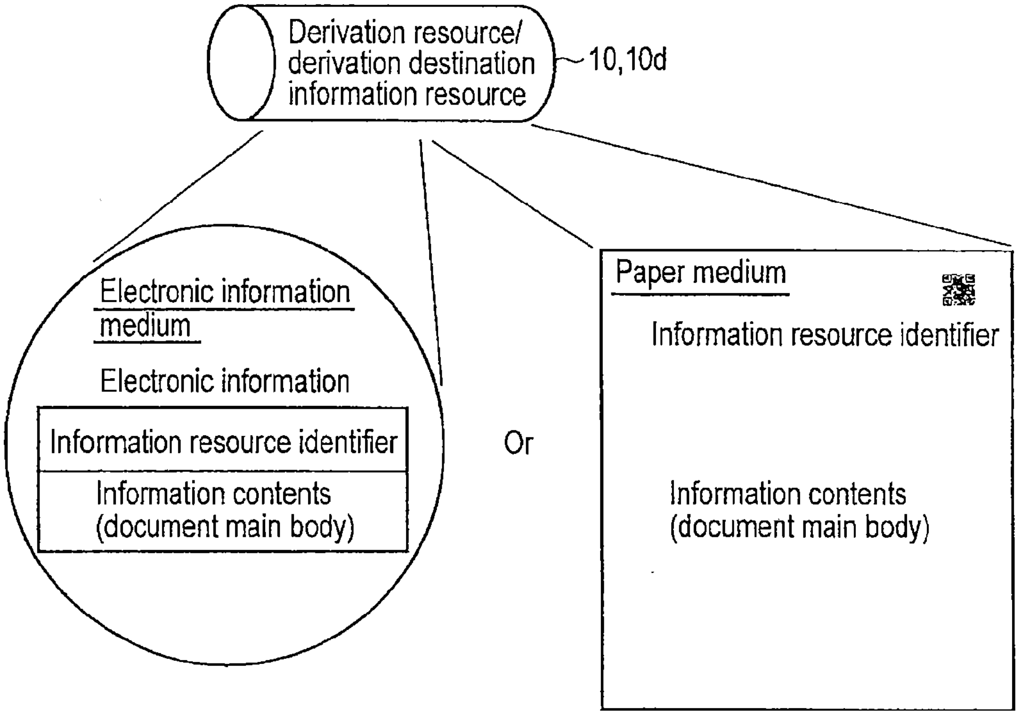
F I G. 3
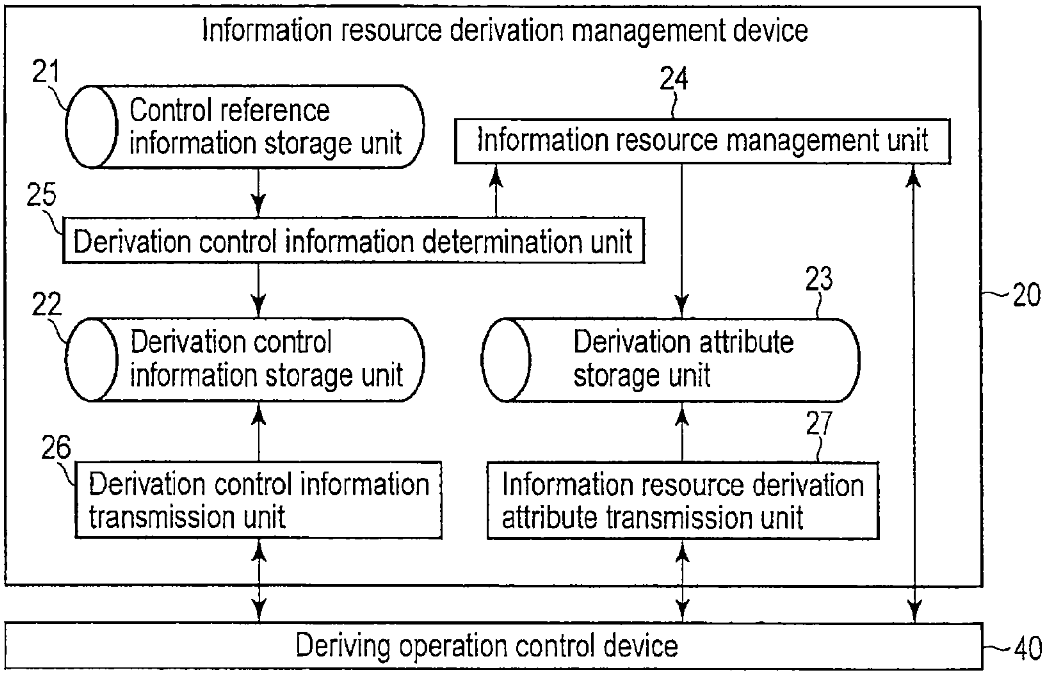
F I G. 4

21a

| Control reference information | |
|---|---|
| Media type | Paper |
| Upper limit value of abundance ratio | 60% |
| Calculated value of abundance ratio | 25% |

Updatable

F I G. 5

22a Derivation control information

| Derivation source information resource | | Derivation destination information resource | |
|---|---|---|---|
| | | Media type | |
| Generation | Media type | Electronic information medium | Paper medium |
| 0 | Electronic information medium | 5000 | 2000 |
| | Paper medium | 3000 | 10 |
| 1 | Electronic information medium | 1000 | 500 |
| | Paper medium | 600 | 5 |
| 2 | Electronic information medium | 40 | 20 |
| | Paper medium | 100 | 0 |

Updatable

F I G. 6

23a Derivation attribute

```
23a1  <DerivationInfo>
23a2    <MediaType>
          DIGITAL
        </MediaType>
23a3    <Parent>0000000000</Parent>
23a4    <Generation>1</Generation>
23a5    <Childs>
          <ChildMediaType="DIGITAL">3</Child>
23a6      <ChildMediaType="PAPER">1</Child>
        </Childs>
      </DerivationInfo>
```

F I G. 7

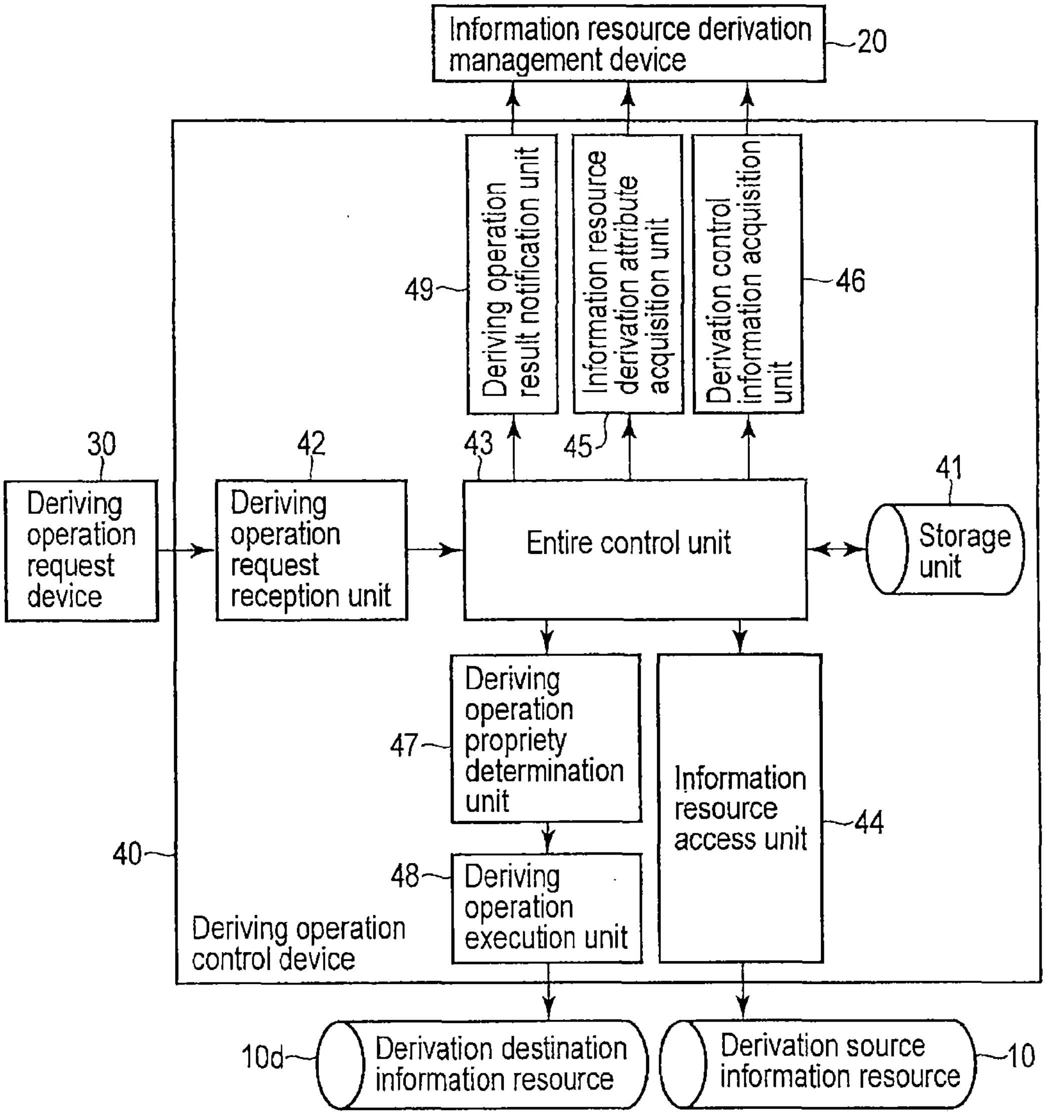
F I G. 1 0
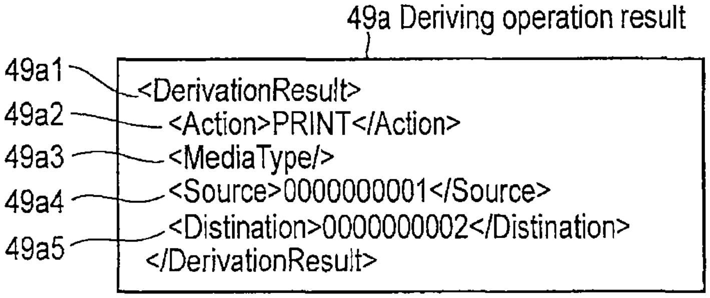
F I G. 1 1

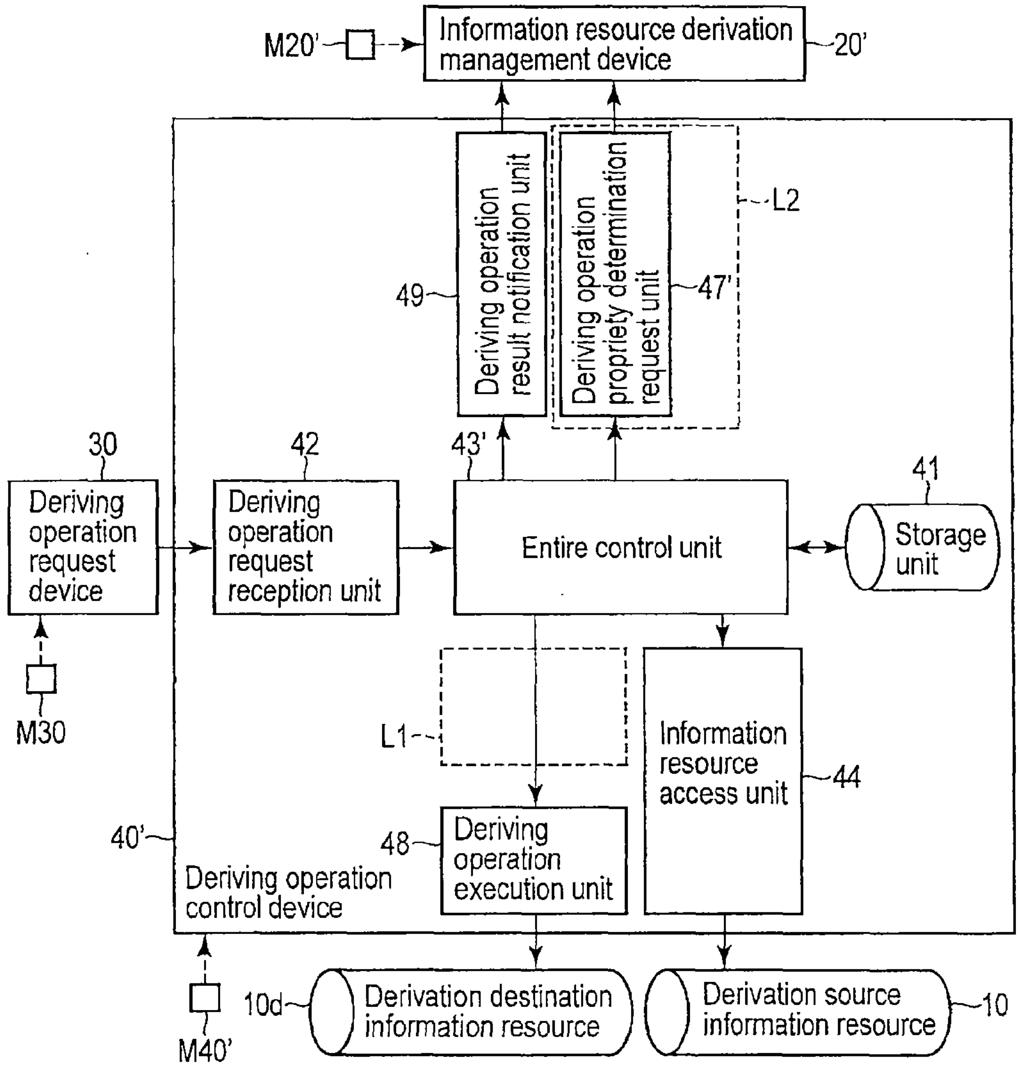
F I G. 1 3

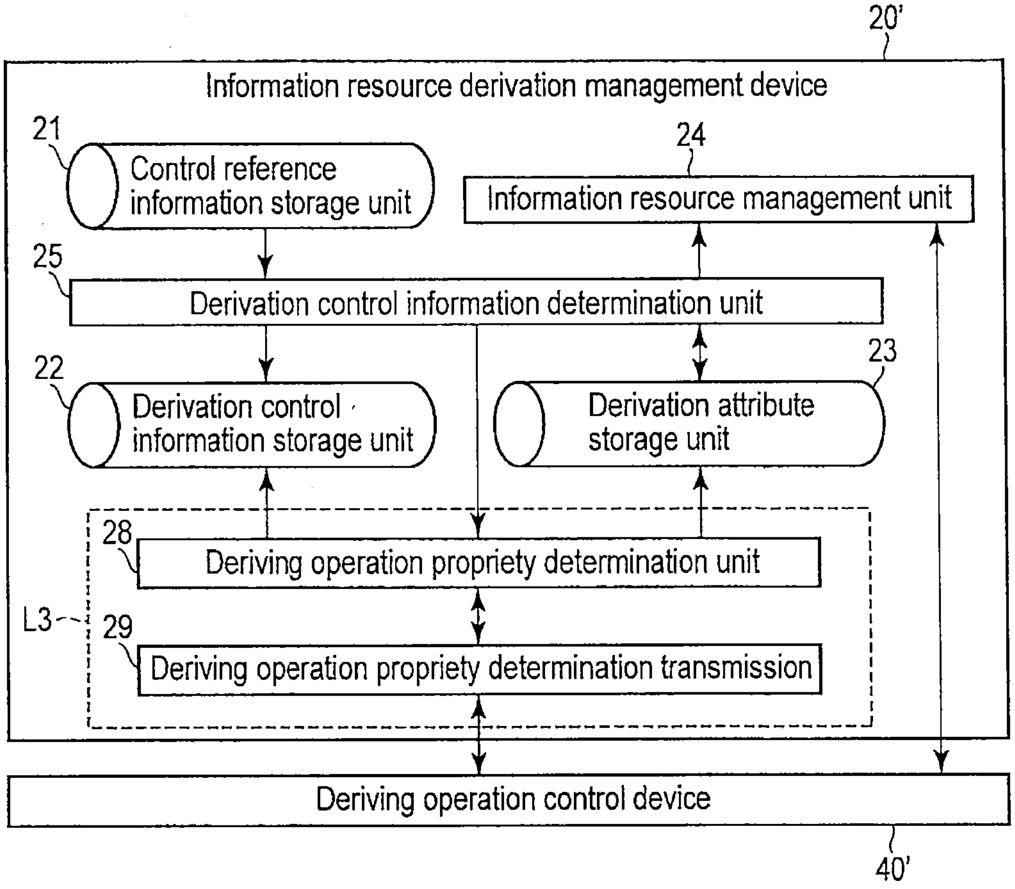
F I G. 1 4

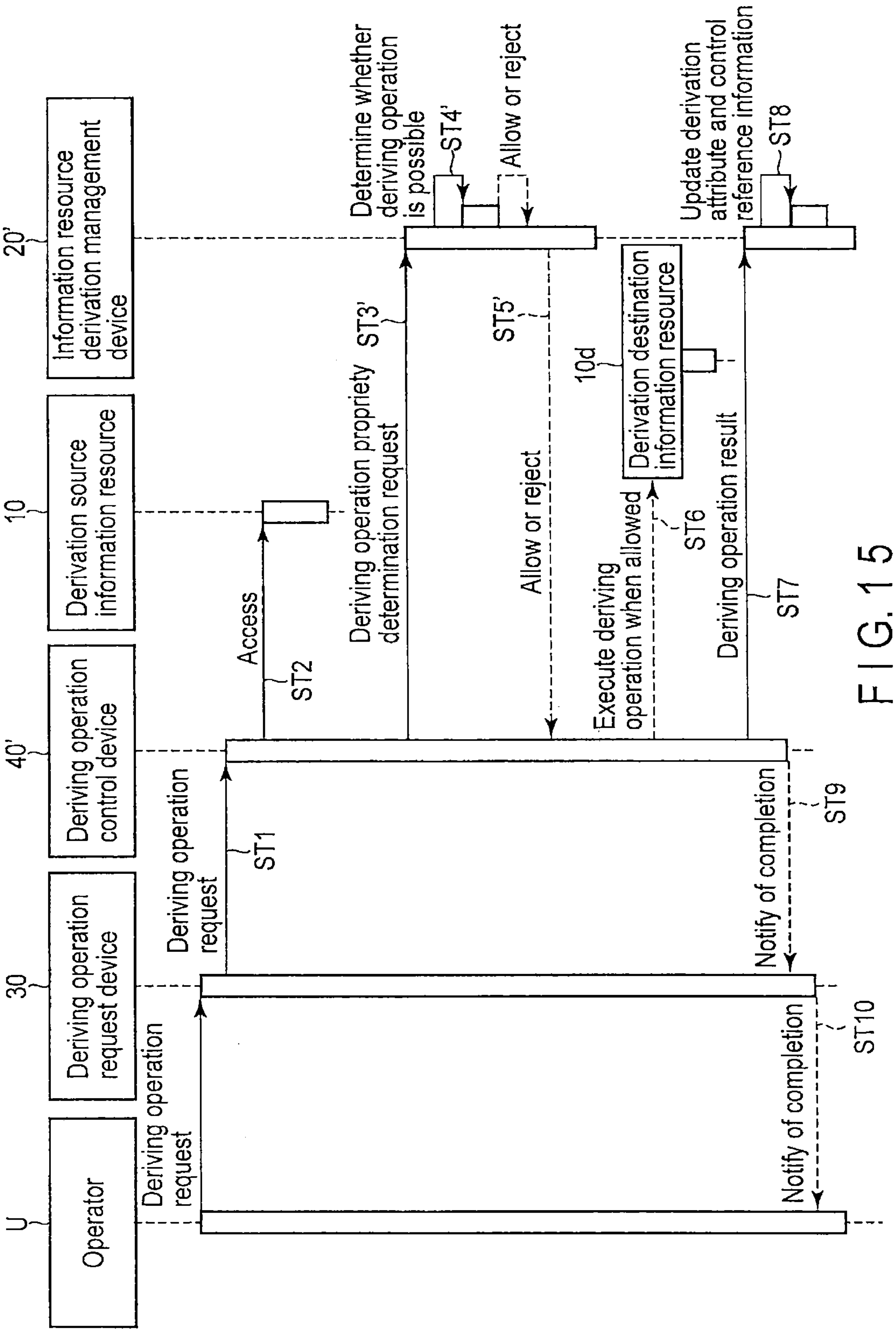
F I G. 1 5

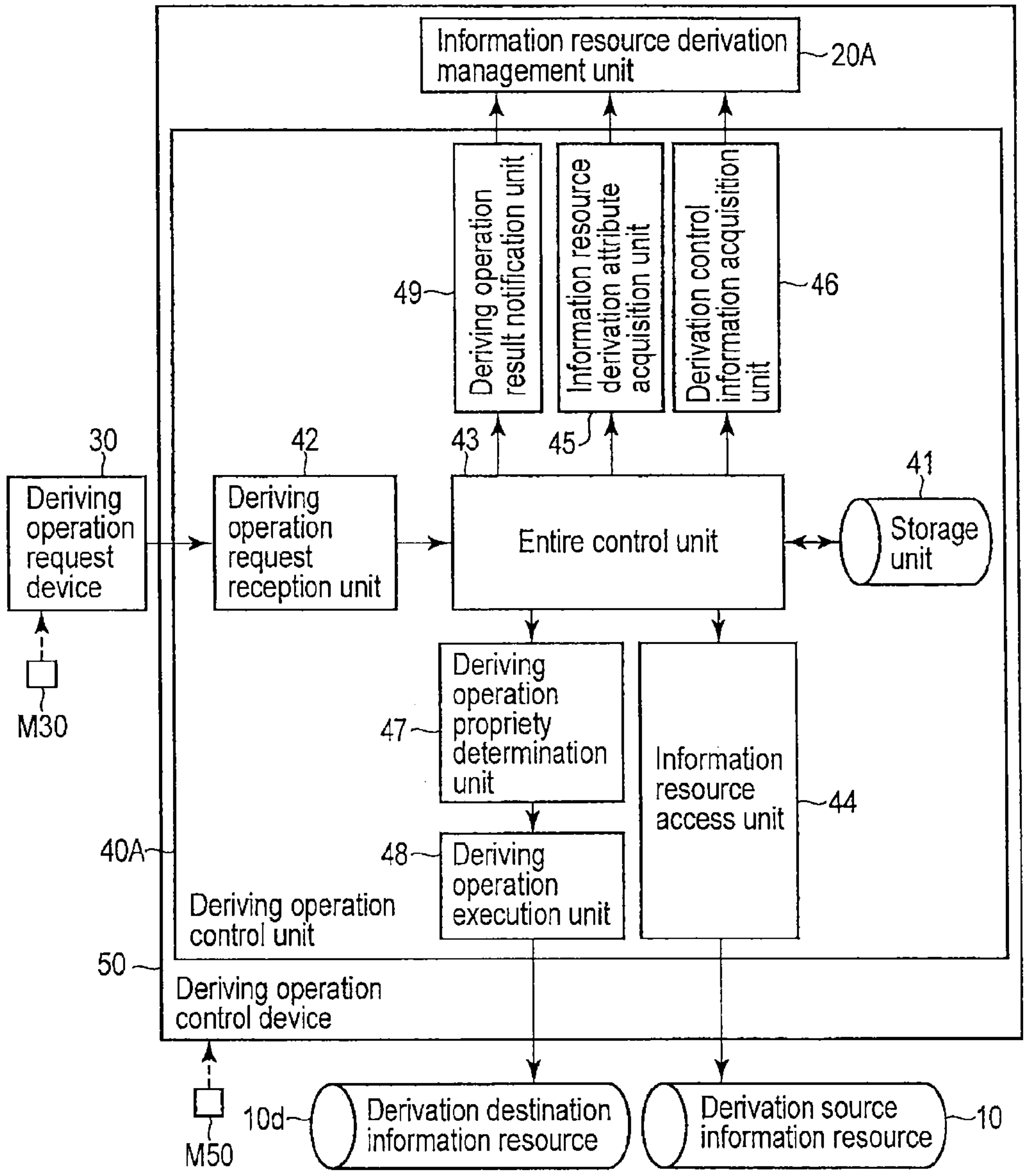
F I G. 1 6

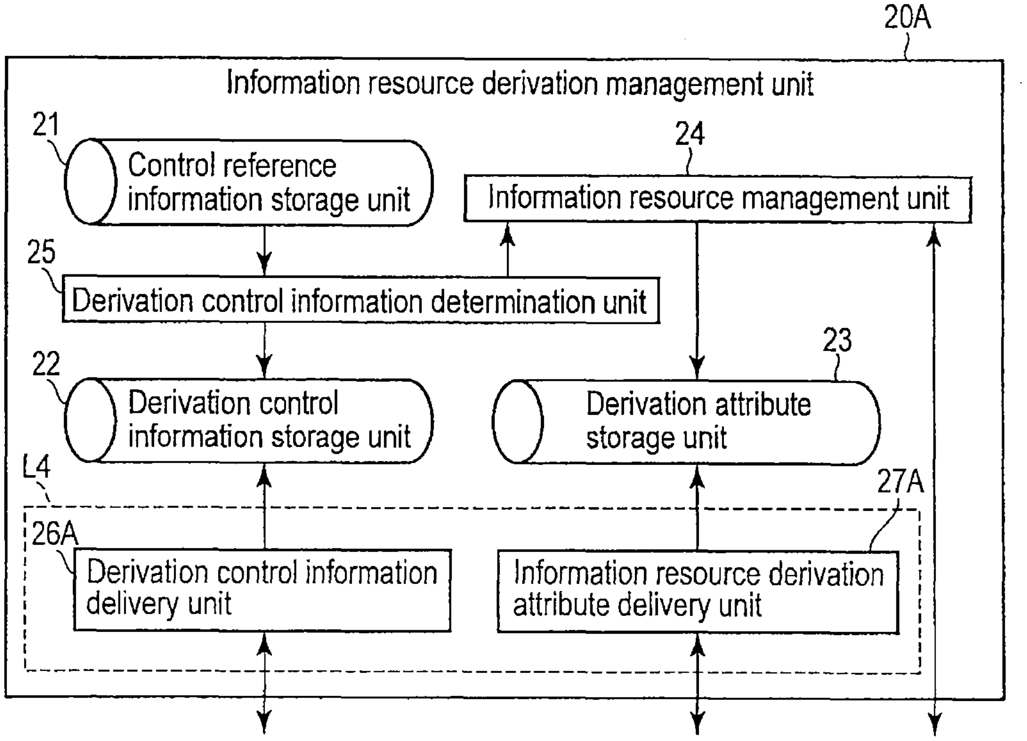
F I G. 1 7

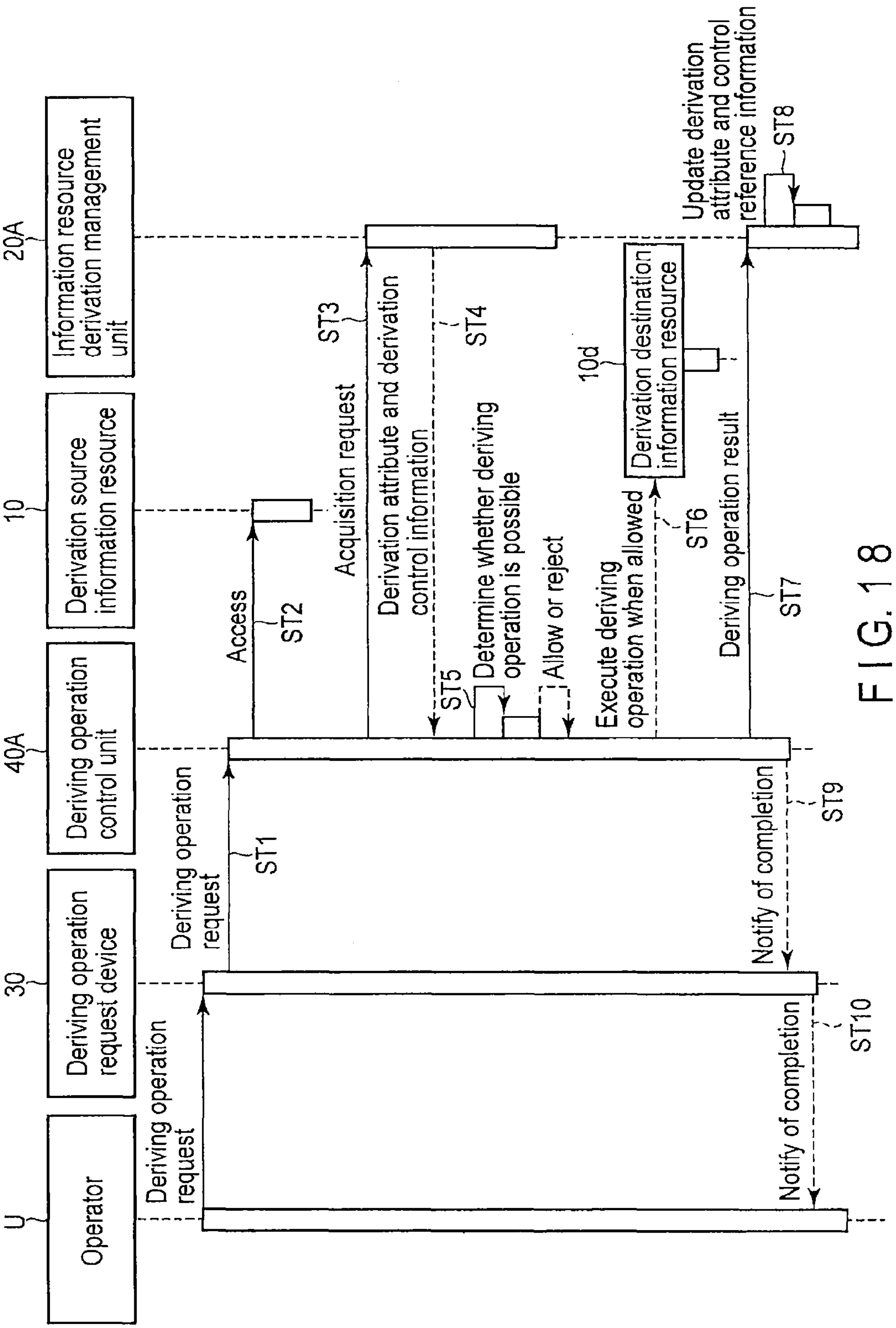
F I G. 1 8

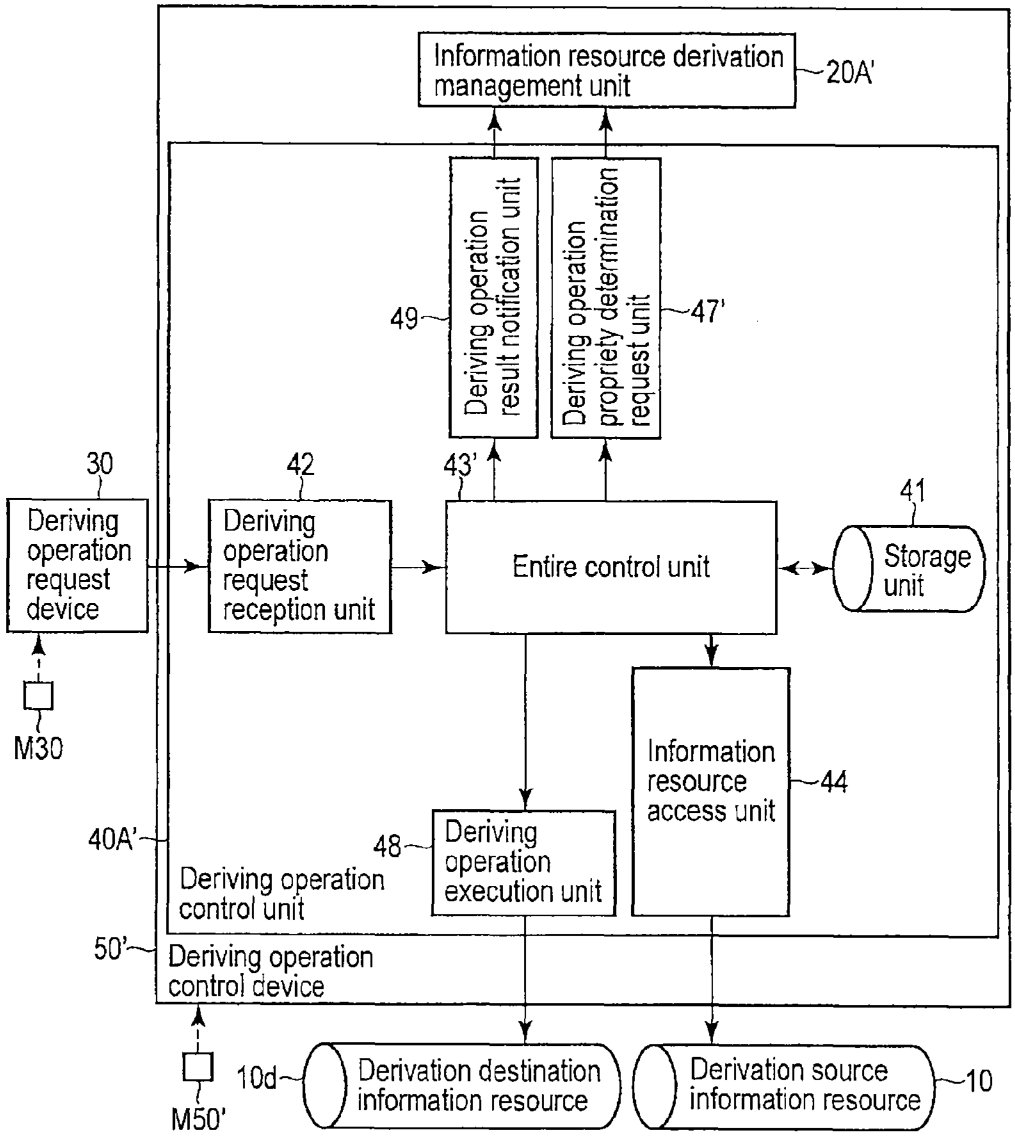
F I G. 1 9

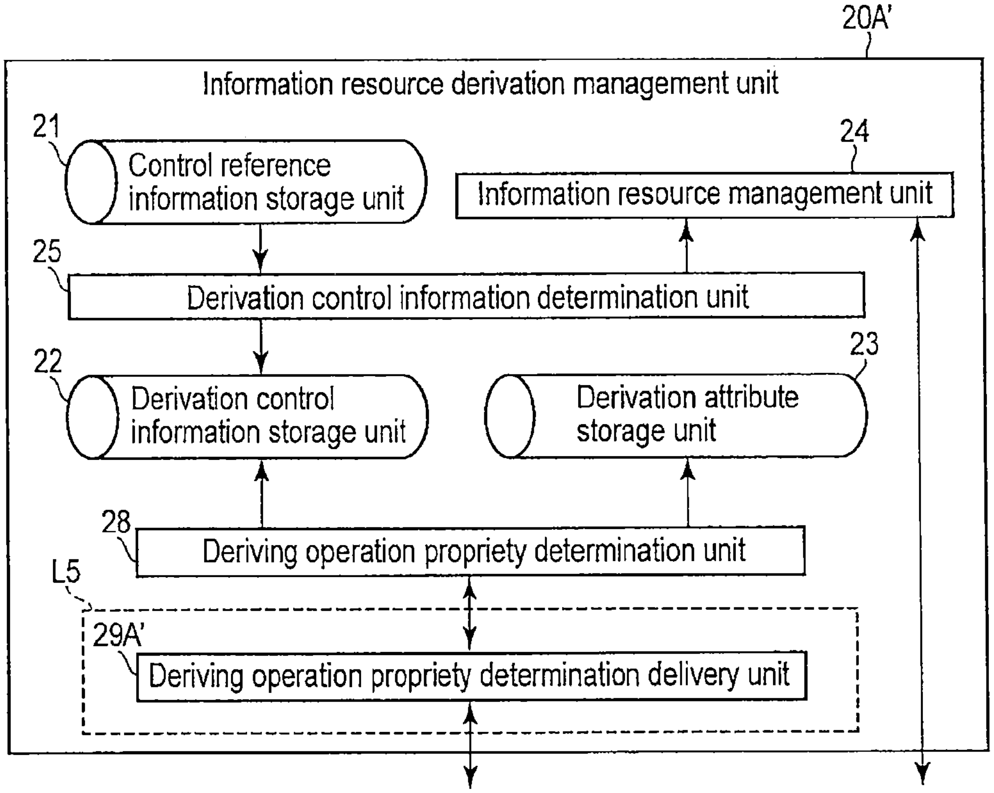
F I G. 2 0

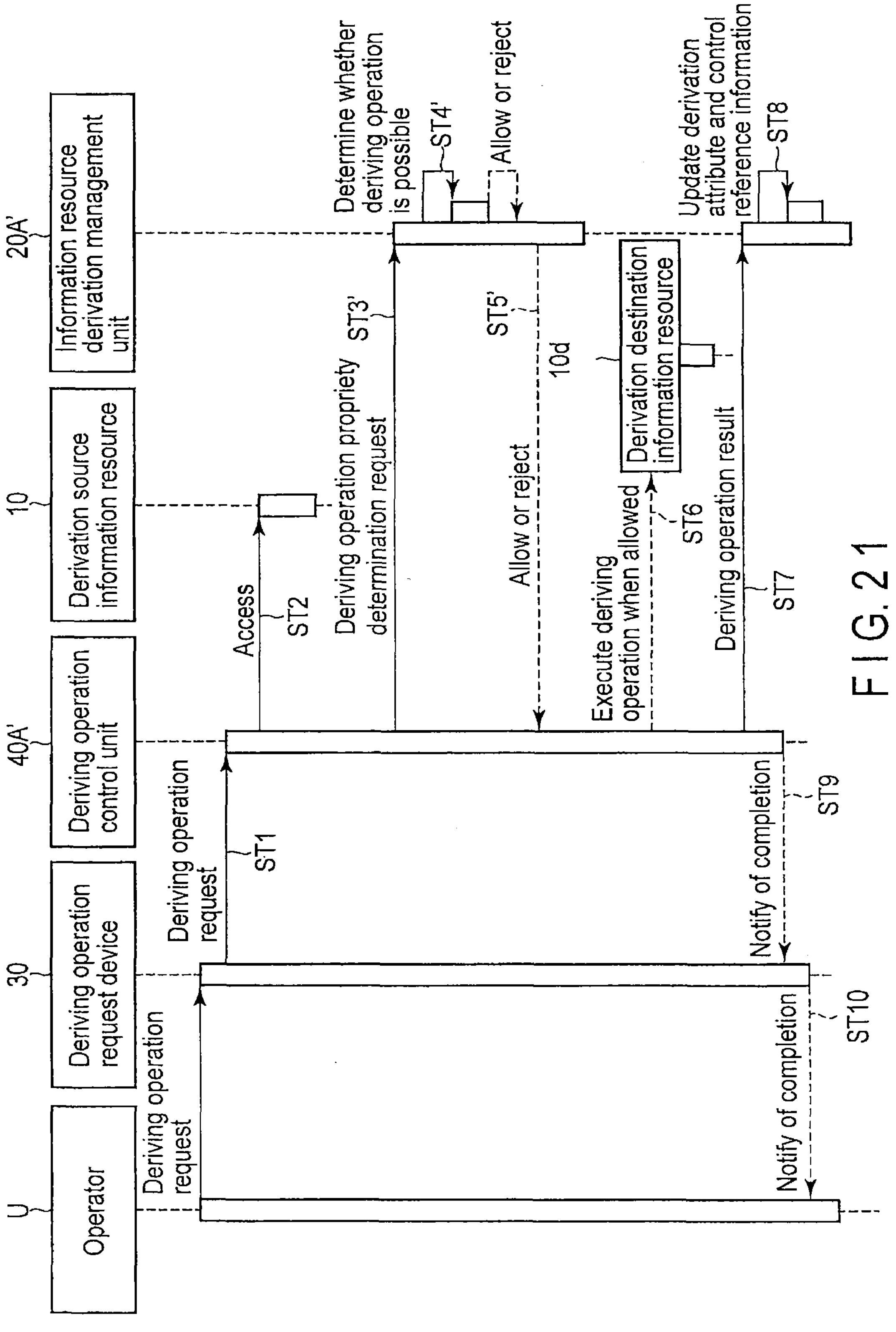
F I G. 2 1

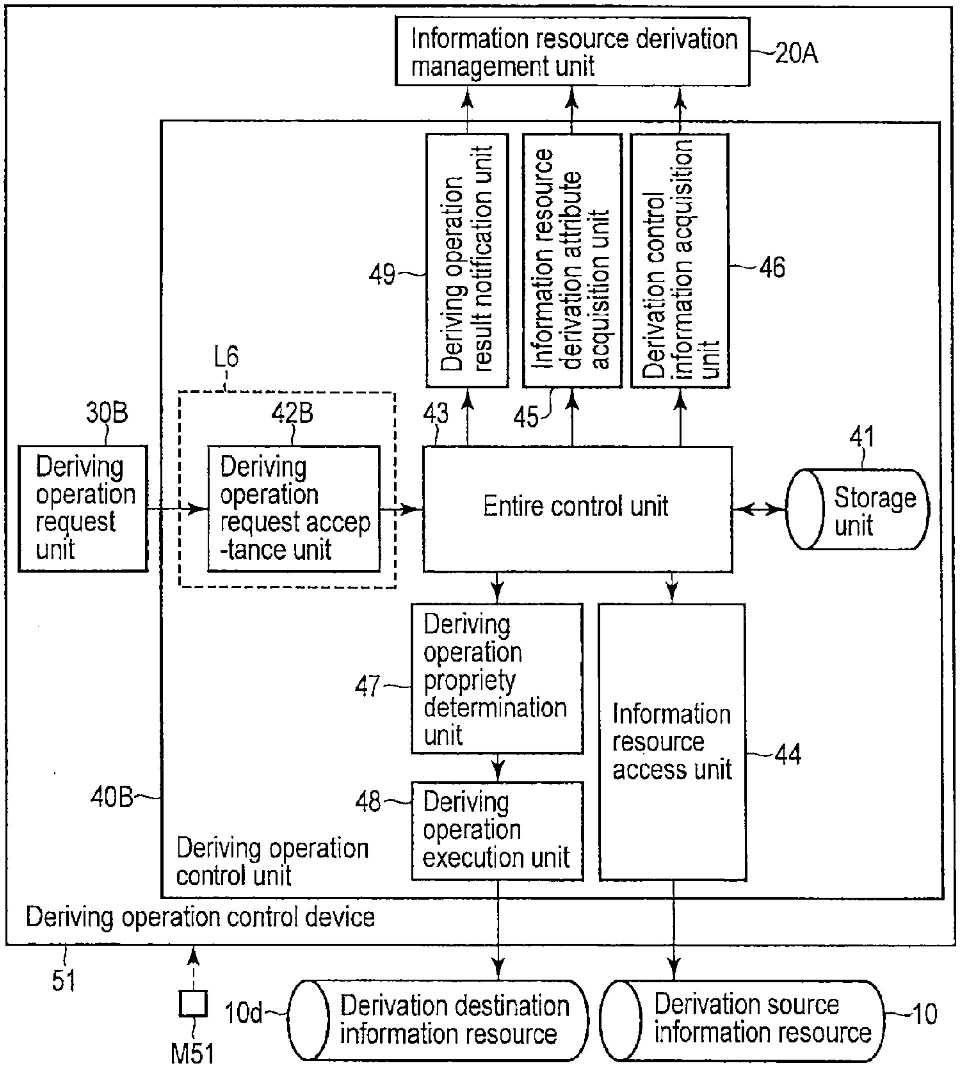
F I G. 2 2
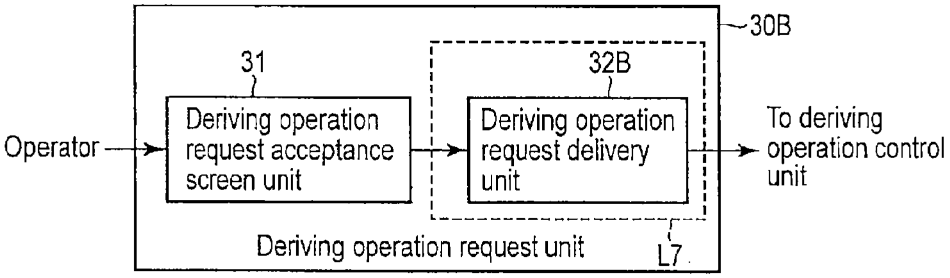
F I G. 2 3

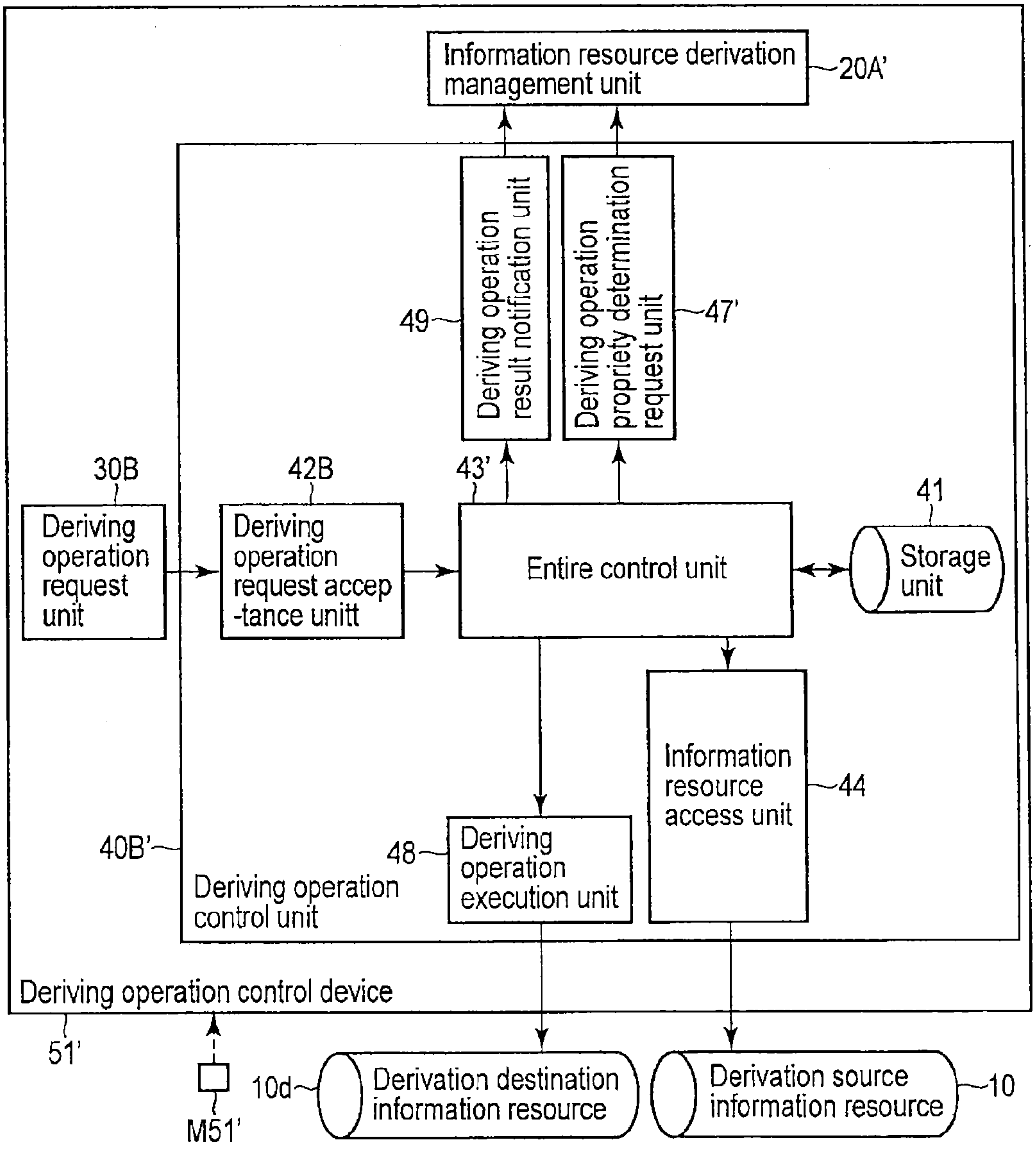
F I G. 2 5

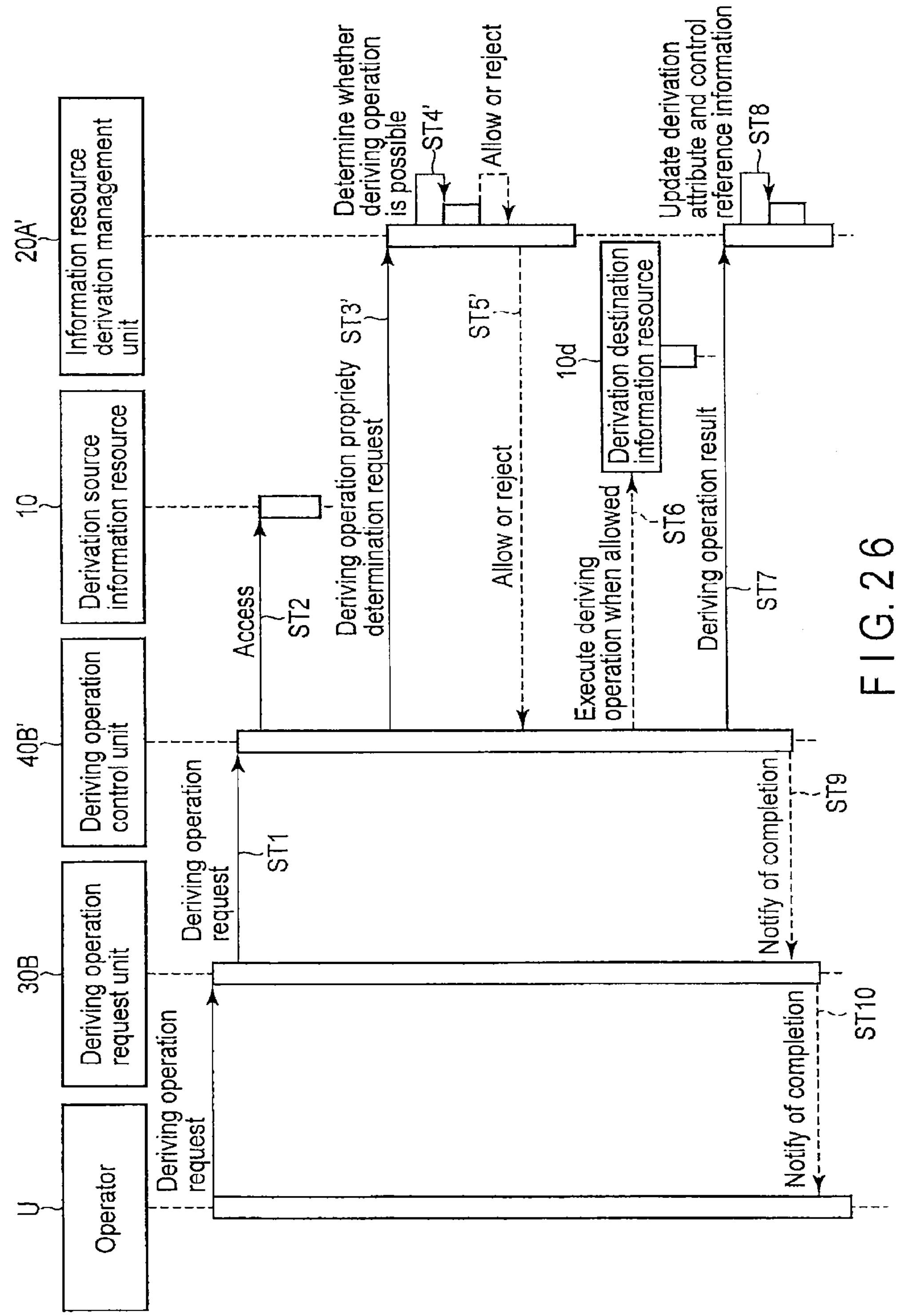
F I G. 2 6

ACCESS CONTROL SYSTEM, APPARATUS, AND PROGRAM

CROSS REFERENCE TO RELATED APPLICATIONS

This application is a Continuation of U.S. application Ser. No. 13/416,133 filed Mar. 9, 2012, which is a Continuation Application of PCT Application No. PCT/JP2010/063704, filed Aug. 12, 2010 and based upon and claiming the benefit of priority from prior Japanese Patent Application No. 2009-208312, filed Sep. 9, 2009, the entire contents of each of which are incorporated herein by reference.

FIELD

Embodiments described herein relate generally to an access control system, apparatus, and program.

BACKGROUND

In recent years, the importance of an access control technology for controlling an action (a behavior) with respect to specific information or processing based on authority information is growing. As such a technology, there is, e.g., access control adopting an action propriety format.

As the access control adopting the action propriety format, there is, e.g., a method which determines that authority information for a document file has a security attribute. In this method, the authority information for the document file is written in an action propriety format, e.g., "view permit" or "edit permit". This type of authority information is known as an access control matrix or an access control list. For example, there has been disclosed a method for setting authority information (a rule) to a document file as a security container.

However, in the access control adopting the action propriety format, it is difficult to write conditions such as an access time or an access location to be permitted or flexible access control contents such as a detailed function limit.

Therefore, there has been utilized access control adopting not only the action propriety format but also an access control policy format. The access control policy is a set of access control rules, and a standard descriptive specification is disclosed. In the access control policy, allowable conditions or a detailed function limit can be described. Therefore, in the access control adopting the access control policy format, when an access request for information is accepted, for example, whether a file can be opened is judged, and then control, e.g., limiting to a function described in the access control policy is enabled. Such a technology is generally also called digital rights management.

Further, in the access control policy format, as one aspect of allowable conditions, clearly specifying authority for replicating information or the number of times that replication can be performed is known. When such conditions are applied to information, replication of the information can be limited. For example, when conditional information in which the number of times that replication can be performed is specified is applied to electronic information, replication of the information is explicitly limited.

In the above-described technology, application based on each specific media type alone, e.g., electronic information alone is assumed, replication control when information is distributed beyond various media types is not performed.

BRIEF DESCRIPTION OF THE DRAWINGS

FIG. 3 is a schematic view showing a structural example of an information resource in the first embodiment;

FIG. 4 is a schematic view showing a functional structure of an information resource derivation management device in the first embodiment;

FIG. 5 is a schematic view showing a structural example of control reference information in the first embodiment;

FIG. 6 is a schematic view showing a structural example of derivation control information in the first embodiment;

FIG. 7 is a schematic view showing a structural example of a derivation attribute in the first embodiment;

FIG. 10 is a schematic view showing a functional configuration of a deriving operation control device in the first embodiment;

FIG. 11 is a schematic view showing a structural example of a deriving operation result in the first embodiment;

FIG. 13 is a schematic view showing a configuration of an access control system in a second embodiment;

FIG. 14 is a schematic view showing a functional configuration of an information resource derivation management device in the second embodiment;

FIG. 15 is a view for explaining an operation in the second embodiment;

FIG. 16 is a schematic view showing a functional configuration of a deriving operation control device in a third embodiment;

FIG. 17 is a schematic view showing a functional configuration of an information resource derivation management unit in the third embodiment;

FIG. 18 is a view for explaining an operation in the third embodiment;

FIG. 19 is a schematic view showing a functional configuration of a deriving operation control device in a fourth embodiment;

FIG. 20 is a schematic view showing a functional configuration of an information resource derivation management unit in the fourth embodiment;

FIG. 21 is a view for explaining an operation in the fourth embodiment;

FIG. 22 is a schematic view showing a functional configuration of a deriving operation control device in a fifth embodiment;

FIG. 23 is a schematic view showing a functional configuration of a deriving operation request unit in the fifth embodiment;

FIG. 25 is a schematic view showing a functional configuration of a deriving operation control device in a sixth embodiment; and FIG. 26 is a view for explaining an operation in the sixth embodiment.

DETAILED DESCRIPTION

Figure 1:
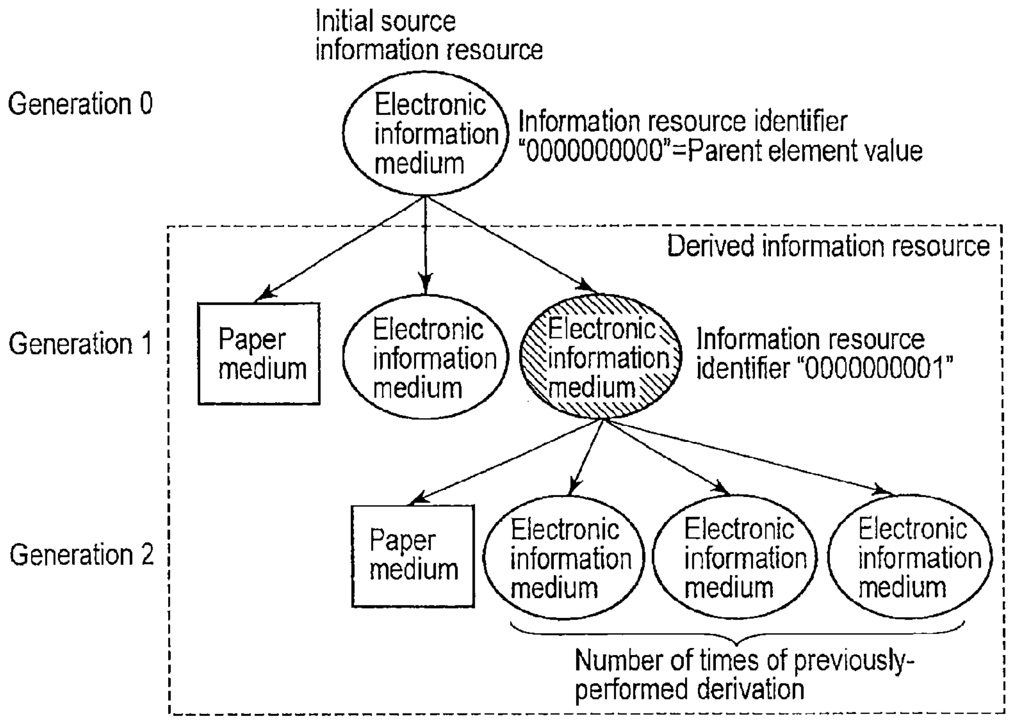
FIG. 1 is a schematic view showing details of derivation of information for explaining an outline of each embodiment.

In general, according to one embodiment, an access control system comprises a deriving operation request device, a deriving operation control device, and an information resource derivation management device. The deriving operation request device transmits a deriving operation request including an information resource identifier of a derivation source information resource, a deriving operation action identifier, and a media type of a derivation destination information resource. The deriving operation control device controls a deriving operation of information in the derivation source information resource based on the deriving operation request. The information resource derivation management device manages derivation control information used for determining whether this deriving operation can be performed.

Specifically, the information resource derivation management device comprises a control reference information storage unit, a derivation control information storage unit, a derivation attribute storage unit, an information resource management unit, a derivation control information determination unit, a derivation control information transmission unit, and an information resource derivation attribute transmission unit. The deriving operation control device comprises an information resource access unit, an information resource derivation attribute acquisition unit, a derivation control information acquisition unit, a deriving operation propriety determination unit, a deriving operation execution unit, and a deriving operation result notification unit.

It is to be noted that the derivation control information storage unit in the information resource management device stores derivation control information obtained by replicating derivation control source data in which the upper limit number of times enabling derivation of a derivation destination information resource for each media type is previously described with respect to a generation number and a media type of the derivation source information resource. The control reference information storage unit stores control reference information including an upper limit value of an abundance ratio of a media type and a calculated value of the abundance ratio in accordance with the media type. This calculated value can be updated. The derivation attribute storage unit stores a derivation attribute in accordance with each information resource identifier. The derivation attribute includes a media type, a generation number, an information resource identifier of the derivation source information resource, and it further includes the number of times of previously-performed derivation of the derivation source information resource for each media type if there is derived information.

Here, when the information resource access unit in the deriving operation control device receives a deriving operation request from the deriving operation request device, it acquires information from the derivation source information resource indicated by an information resource identifier based on the information resource identifier of the derivation source information resource in the deriving operation request.

The information resource derivation attribute acquisition unit and the derivation control information acquisition unit transmit an acquisition request to the information resource derivation management device based on the deriving operation request, thereby acquiring derivation control information and a derivation attribute from the information resource derivation management device in response to the acquisition request.

The deriving operation propriety determination unit extracts the number of times of the previously-performed derivation associated with a media type of the derivation destination information resource in the deriving operation request from the numbers of times of previously-performed derivation of the derivation destination information resource for respective media types in the acquired derivation attribute.

The deriving operation propriety determination unit extracts the upper limit number of times enabling derivation associated with both the media type and the generation number in the acquired derivation attribute and a media type of the derivation destination information resource in the deriving operation request from the upper limit numbers of times enabling derivation of the derivation destination information resource for respective media types associated with the generation number and the media type of the derivation source information resource in the acquired derivation control information.

The deriving operation propriety determination unit determines that a deriving operation with respect to the deriving operation request is possible when the number of times of previously-performed derivation is not greater than the upper limit number of times enabling derivation based on the extracted number of times of previously-performed derivation and the extracted upper limit number of times enabling derivation.

The deriving operation execution unit executes the deriving operation based on the deriving operation request when deriving operation determining means determines that the deriving operation is possible.

The deriving operation result notification unit notifies the information resource derivation management device of a result of the deriving operation after end of the deriving operation executed by deriving operation executing means.

When the derivation control information determination unit 25 in the information resource derivation management device receives an acquisition request including an information resource identifier of the derivation source information resource and a media type of the derivation destination information resource from the deriving operation control device, it replicates derivation control source data and writes derivation control information into the derivation control information storage unit.

The derivation control information determination unit searches for a derivation attribute in the derivation attribute storage unit based on the information resource identifier in the acquisition request.

The derivation control information determination unit totalizes the numbers of times of previously-performed derivation for respective media types in the derivation attribute obtained by the search, thereby obtaining a total value.

The derivation control information determination unit calculates an abundance ratio of each media type indicative of a physical media based on the total value and the number of times of previously-performed derivation of the media type indicative of the physical media in the respective media types in the derivation attribute obtained by the search, thereby obtaining a calculated value.

The derivation control information determination unit updates a calculate value in the control reference information to the calculated value obtained by calculation.

The derivation control information determination unit determines whether the calculated value is not smaller than an upper limit value in the control reference information after updating the calculated value.

As a result of this determination, when the calculated value is not smaller than the upper limit value, the derivation control information determination unit updates the upper limit number of times enabling derivation of the derivation control information in the derivation control information storage unit to a zero value.

When the value is updated to the zero value or when a result of the determination is negative, the information resource derivation attribute transmission unit transmits the derivation control information in the derivation control information storage unit and the derivation attribute obtained by the search to the deriving operation control device in response to the acquisition request.

Furthermore, when the information resource management unit receives a deriving operation result including the information resource identifier of the derivation source information resource, the information resource identifier of the derivation destination information resource, and the media type of the derivation destination information resource from the deriving operation control device after end of the deriving operation, it updates the number of times of previously-performed derivation based on the information resource identifier of the derivation source information resource and the media type of the derivation destination information resource in the deriving operation result.

The information resource management unit writes a new derivation attribute including a media type, a generation number, and the information resource identifier of the derivation source information resource into the derivation attribute storage unit in association with the information resource identifier of the derivation destination information resource in the deriving operation result.

Although each embodiment will be described hereinafter with reference to the drawings, an outline of each embodiment will be explained beforehand with reference to FIG. 1. FIG. 1 is a schematic view showing details of derivation of information over respective generations, and it illustrates details about derivation of information in the same or different media types (MediaType) from an initial source information resource of a zeroth generation to respective generations.

As the outline of each embodiment, when controlling access for such derivation of information over the respective generations and the respective medial types, an abundance ratio of each media type is controlled while managing a total number of pieces of information to be derived in accordance with each media type.

For example, the upper limit number of times enabling derivation for each media type in each generation is set and, on the other hand, the number of times of previously-performed derivation for each media type is recorded in accordance with each derivation source information resource, whereby the total number of pieces of information to be derived can be managed in accordance with each media type by comparing these numbers of times. Moreover, for example, an upper limit value of an abundance ratio of a paper medium is set and, on the other hand, an abundance ratio is calculated from the number of times of previously-performed derivation for each media type, whereby the abundance ratio of each media type can be controlled by comparing these abundance ratios.

Therefore, it is sufficient to realize management of the total number of pieces of information or control over the abundance ratio described above based on processing using the upper limit number of times enabling derivation for each media type in each generation, the number of times of previously-performed derivation of the derivation source information resource for each media type, the upper limit value of the abundance ratio of each media type, and others.

The above has described the outline of each embodiment. Such an outline can be carried out by assigning processing to devices and the processing can be likewise carried out by a single device as will be described in the following respective embodiments.

Additionally, when the processing is assigned to the devices, assignment of the processing to the respective devices or respective functional units can be appropriately modified. As all the possible embodiments and modifications could not be described here, several typical embodiments will be explained hereinafter. Further, a deriving operation control device in each embodiment may be called "a multi function printer (MFP)", "a multi function copying machine", or "a multi function facsimile" as desired.

It is to be noted that each of the following devices can be carried out by a hardware configuration or a combined configuration of a hardware resource and software in accordance with each device. As the software in the combined configuration, there is adopted a program that is installed in a computer of each device 20, 30, 40, 40', 50, 50', 51, or 51' from a network or a storage medium M20, M30, M40, M40', M50, M50', M51, or M51' in advance and executed by a processor in each device. Each program allows the processor to execute processing of each device.

First Embodiment

Figure 2:
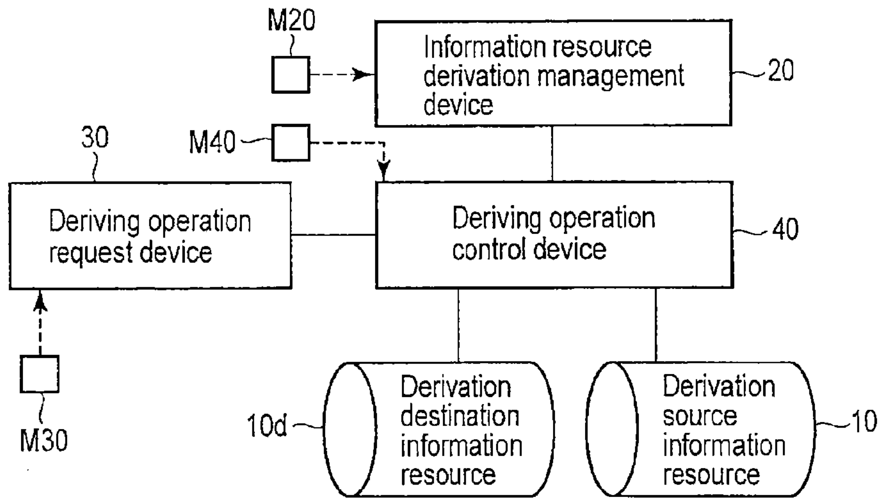
FIG. 2 is a schematic view showing a configuration of an access control system according to a first embodiment.

FIG. 2 is a schematic view showing a configuration of an access control system according to a first embodiment. This access control system controls access for deriving information from a derivation source information resource 10 to a derivation destination information resource 10*d*. Specifically, the access control system comprises an information resource derivation management device 20, a deriving operation request device 30, and a deriving operation control device 40. The respective devices 20, 30, and 40 can communicate with each other through the network and the like.

Here, as the derivation source information resource 10 and the derivation destination information resource 10*d*, either an electronic information medium (electronic information) or a paper medium can be used as shown in FIG. 3. Further, besides the paper medium, a portable recording medium such as a CD-ROM can be used. The electronic information medium is stored in a non-illustrated storage device, and it includes at least an information resource identifier and information contents (a document main body). Likewise, at least an information resource identifier and information contents (a document main body) are printed on the paper medium. However, it is needless to say that, when the paper medium is used for the derivation destination information resource 10*d*, and a deriving operation is not executed yet, the information resource identifier and the information contents (the document main body) are not printed. As the information resource identifier on the paper medium, besides a human-readable character format, a computer-readable identification tag may be provided. For example, the identification tag can be provided (printed or attached) by a printing device, and it is possible to adopt not only an illustrated QR code (a registered trademark) but also any conformation such as a barcode, a two-dimensional code, a color code, a watermark, or an RFID as long as the identification tag is an optical tag or an electronic tag that can store the information resource identifier. As the information resource identifier, identification information that can uniquely identify an information resource can be used.

The information resource derivation management device 20 is a device that manages derivation control information 22*a* for an information resource, and it is, e.g., a server device. Specifically, the information resource derivation management device 20 includes a control reference information storage unit 21, a derivation control information storage unit 22, a derivation attribute storage unit 23, an information resource management unit 24, a derivation control information determination unit 25, a derivation control information transmission unit 26, and an information resource derivation attribute transmission unit 27 as shown in FIG. 4. It is to be noted that, as the control reference information storage unit 21, the derivation control information storage unit 22, and the derivation attribute storage unit 23, different regions in the same or different storage devices can be used.

Here, the control reference information storage unit 21 is a storage unit that is readable/writable by the respective units 24 to 27, and it stores control reference information 21*a* including an upper limit value of an abundance ratio of a media type and a calculated value of the abundance ratio in accordance with the media type as shown in FIG. 5. The calculated value of the abundance ratio can be updated.

The derivation control information storage unit 22 is a storage unit that is readable/writable by the respective units 24 to 27, and it stores the derivation control information 22*a* obtained by replicating derivation control source data (not shown), in which the upper limit number of times enabling derivation of the derivation destination information resource for each media type is previously written, in accordance with a generation number and a media type of the derivation source information resource as shown in FIG. 6. The upper limit number of times enabling derivation of the derivation destination information resource of the paper medium can be updated.

In addition, the derivation control information 22*a* is information that functions as a benchmark when controlling a deriving operation, and an example where this information is represented by a three-dimensional table structure format is shown in this embodiment, but the present invention is not restricted thereto, and the information may be represented by, e.g., an XACML format, and a representation format is arbitrary. The derivation control information 22*a* is constituted of a derivation source media type item, a derivation destination media type item, and a generation item of the derivation source information resource, and the upper limit number of times enabling derivation is shown in accordance with each intersecting point of the respective items.

The derivation attribute storage unit 23 is a storage unit that is readable/writable by the respective units 24 to 27, and it stores a derivation attribute 23*a* in accordance with each information resource identifier (not shown) as depicted in FIG. 7. The derivation attribute 23*a* includes a media type 23*a*2, a generation number 23*a*4, and an information resource identifier 23*a*3 of the derivation source information resource, and it further includes the number of times of previously-performed derivation of the derivation destination information resource for each media type if there is derived information. Other pieces of information 23*a*1 and 23*a*5 are arbitrary additional items that can be omitted when an XML format is not used, but the XML format is adopted in this example, and hence these pieces of information are written.

In addition, as shown in FIG. 1, the derivation attribute 23*a* is attribute information indicative of details of derivation of the information resource. The derivation attribute 23*a* is constituted of a parent information resource identification item indicative of a derivation source of the information resource, a generation item indicative of a number of a generation of the derivation from an information resource as an initial source (an initial source information resource), and a child information resource number item indicative of a result of counting the number of information resources derived from the information resource in accordance with each media type. The parent information resource identification item is required when verifying details of the derivation from the initial source information resource.

In the example depicted in FIG. 7, the derivation attribute 23*a* is written in a skeleton representation in the XML format, and an element or an attribute, a name space, and the like other than necessary minimum items are deleted. This example uses a derivation attribute associated with an information resource indicated by an information resource identifier "0000000001".

The derivation information (DerivationInfo) element 23*a*1 is an element indicative of the derivation attribute 23*a*.

The media type (MediaType) element 23*a*2 is indicative of a media type of the information resource identifier "0000000001". "DIGITAL" represents an electronic information medium.

The parent identification (Parent) element 23*a*3 is an element indicative of a parent information resource (a derivation source information resource) identification item. This example shows that an electronic information medium of the first generation indicated by a slash mark is derived from the information resource 10 with an information resource identifier "0000000000" of the zeroth generation. It is to be noted that the first source information resource of the zeroth generation is a parent information resource for the information resource of the first generation, but a direct derivation source information source of the preceding generation is a parent information resource for information resources of the second and subsequent generations. Further, the parent identification (Parent) element 23*a*3 is not included in the derivation attribute 23*a* of the initial source information resource of the zeroth generation. In other words, an information resource having the derivation attribute 23*a* which does not include the parent identification (Parent) element 23*a*3 is the initial source information resource.

The generation identification (Generation) element 23*a*4 is an element indicative of a generation item (which is also called a generation number). In this example, assuming that the first source information resource is the zeroth generation, this element represents the first generation progressed from the initial source information resource.

The child set (Childs) element 23*a*5 is an element for organizing a child (Child) element indicative of a child information resource number item.

The child media type (MediaType of a Child element) attribute 23*a*6 is indicative of a media type of the derivation destination information resource. In this example, a media type (MediaType) attribute value "DIGITAL" represents an electronic information medium, and a media type (MediaType) attribute value "PAPER" represents a paper medium. This media type (MediaType) attribute value is just an example, and defining the media type (MediaType) attribute value in accordance with a media type to be applied can suffice. A child (Child) element value is indicative of a total number of times that derivation has been performed (the number of times of previously-performed derivation) from the information resource with respect to a media type indicated by a media type (MediaType) attribute.

The information resource management unit 24 is a functional unit configured to receive a deriving operation result 49*a* transmitted from the deriving operation control device 40 and manage a total number of media types of all information resources. The information resource management unit 24 updates the control reference information 21*a* in accordance with the total number of the media types of all the information resources that fluctuates depending on the deriving operation result 49*a*. Further, when the derivation attribute 23*a* is managed by the information resource derivation management device 20, a derivation attribute 23*a* of a derivation destination information resource is newly generated to update the derivation attribute 23*a* of the derivation source information resource 10. When updating the derivation attribute 23*a* of the derivation source information resource 10, for example, "1" is added to the number of times of previously-performed derivation of the paper medium in the above instance.

In addition, the information resource management unit 24 has the following functions (f24-1) to (f24-2).

(f24-1) is a previously-performed derivation number updating function for updating the number of times of previously-performed derivation based on an information resource identifier of a derivation source information resource and a media type of a derivation destination information resource in a deriving operation result upon receiving the deriving operation result including the information resource identifier of the derivation source information resource, an information resource identifier of the derivation destination information resource, and the media type of the derivation destination information resource from the deriving operation control device 40 after end of the deriving operation performed by the deriving operation control device 40.

(f24-2) is a derivation attribute write function for writing a new derivation attribute 23*a* including a media type, a generation number, and an information resource identifier of a derivation source information resource in the derivation attribute storage unit 23 in association with the information resource identifier of the derivation destination information resource in the deriving operation result.

The derivation control information determination unit 25 is a functional unit configured to determine the derivation control information 22*a* associated with information of the derivation source information resource 10 included in an acquisition request for the derivation control information 22*a* received by the derivation control information transmission unit 26. At this time, the derivation control information determination unit 25 refers to the control reference information 21*a* for controlling an abundance ratio of each media type of all the information resources from the control reference information storage unit 21, thereby determining the derivation control information 22*a*. More specifically, the control reference information 21*a* indicates a value for dynamically changing the upper limit number of times enabling derivation of each media type included in the derivation control information 22*a*. For example, in regard to the control reference information 21*a*, an upper limit value of an abundance ratio of a specific media type is determined, such as "paper medium: 60%", and the upper limit number of times enabling derivation of the corresponding derivation control information 22*a* is dynamically changed (for example, the value is set to "0") when the abundance ratio of the specific media type is not smaller than this upper limit value. The plurality of pieces of derivation control information 22*a* may be provided, and the derivation control information may be appropriately selected in accordance with an abundance ratio of a media type of an information resource. The abundance ratio of the media type of the information resource is managed by the later-described information resource management unit 24. In this manner, the derivation control information 22*a* in the derivation control information storage unit 22 is appropriately changed based on the abundance ratio of the media type of the information resource managed by the information resource management unit 24.

In addition, the derivation control information determination unit 25 has the following functions (f25-1) to (f25-7).

(f25-1) is a function for replicating derivation control source data and writing the derivation control information 22*a* into the derivation control information storage unit 22 upon receiving an acquisition request including an information resource identifier of a derivation source information resource and a media type of a derivation destination information resource from the deriving operation control device 40.

(f25-2) is a derivation attribute search function for searching for the derivation attribute 23*a* in the derivation attribute storage unit 23 based on the information resource identifier in the acquisition request.

(f25-3) is a previously-performed derivation number totalizing function for totalizing the number of times of previously-performed derivation for each media type in the derivation attribute 23*a* obtained by the search, thereby obtaining a total value.

(f25-4) is an abundance ratio calculating function for calculating an abundance ratio of each media type indicative of a physical medium based on the total value and the number of times of previously-performed derivation of the media type indicative of the physical medium in the respective media types in the derivation attribute 23*a* obtained by the search, thereby obtaining a calculated value.

(f25-5) is an updating function for updating a calculated value in the control reference information 21*a* to the calculated value obtained by the calculation.

(f25-6) is a control reference determining function for determining whether the calculated value is not smaller than an upper limit value in the control reference information 21*a* after updating this calculated value.

(f25-7) is an upper limit number updating function for updating an upper limit number of times enabling derivation in the derivation control information 22*a* in the derivation control information storage unit 22 to a zero value when the calculated value is not smaller than the upper limit value as a result of this judgment.

The derivation control information transmission unit 26 is a functional unit configured to transmit the derivation control information 22*a* determined by the derivation control information determination unit 25 in response to the acquisition request for the derivation control information 22*a* from the deriving operation control device 40.

The information resource derivation attribute transmission unit 27 is a functional unit configured to transmit the derivation attribute 23*a* in the derivation attribute storage unit 23 to the deriving operation control device 40 in response to the acquisition request for the derivation attribute 23*a* from the deriving operation control device 40. In addition, the transmission of the derivation control information 22*a* and the derivation attribute 23*a* by the respective transmission units 26 and 27 is executed when updating to the zero value is effected by the upper limit number updating function (f25-7) of the derivation control information determination unit 25 or when a result of the determination made by the control reference determining function (f25-6) is negative, respectively.

The deriving operation request device 30 is a terminal device (e.g., a PC) operated by an operator. A deriving operation request accepted by the deriving operation request device 30 is not only input by an operation of the operator but also read from a program present in the deriving operation request device 30 or fetched from an electronic text received from an external device. In any case, the deriving operation request device 30 requests for a deriving operation of an information resource based on the accepted deriving operation request. At this time, the information resource which is a deriving operation target is called a "derivation source information resource".

Figure 8:
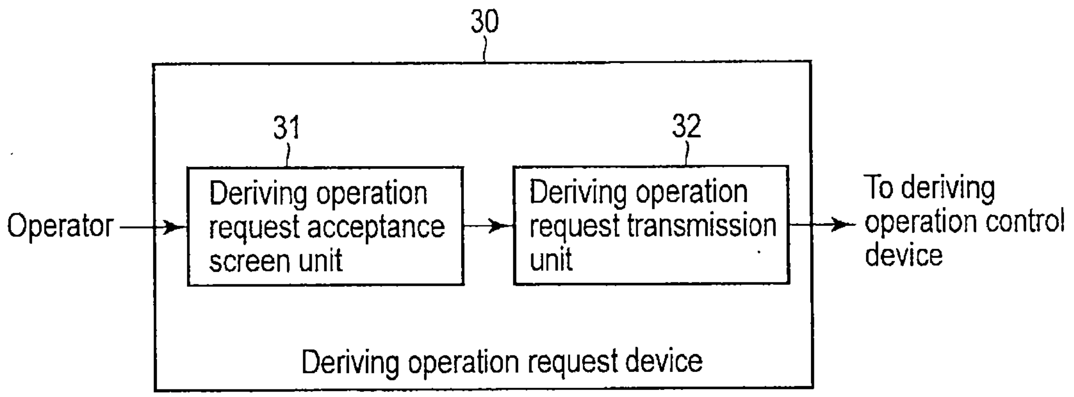
FIG. 8 is a schematic view showing a functional configuration of a deriving operation request device in the first embodiment.

As shown in FIG. 8, the deriving operation request device 30 comprises a deriving operation request acceptance screen unit 31 and a deriving operation request transmission unit 32.

The deriving operation request acceptance screen unit 31 is a functional unit configured to accept a request for a deriving operation for a specific information resource from an operator. Preferably, there is a graphic user interface (GUI) or a command line user interface (CUI), but taking an arbitrary interface conformation can suffice.

Figure 9:
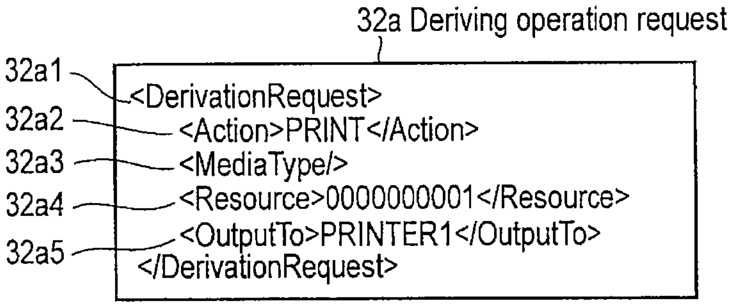
FIG. 9 is a schematic view showing a structural example of a deriving operation request in the first embodiment.

As shown in FIG. 9, the deriving operation request transmission unit 32 is a functional unit configured to transmit a deriving operation request 32*a* accepted by the deriving operation request acceptance screen unit 31 to the deriving operation control device 40. The deriving operation request 32*a* includes at least an information resource identifier of a derivation source information resource, a deriving operation action identifier, and a media type of a derivation destination information resource. However, in this embodiment, the deriving operation action identifier includes a media type at the time of derivation.

For example, a deriving operation from an electronic information medium to a paper medium has a format such that its deriving operation action identifier semantically includes a media type when derivation is performed, such as "PRINT". The format is just an example, and a media type when derivation is explicitly performed may be written. It is to be noted that a media type of an information resource as a deriving operation target is called a "derivation source media type", and a media type when derivation is performed is called a "derivation destination media type". Further, an output destination of a derived information resource generated by the deriving operation may be explicitly written. For example, when the deriving operation action identifier is "PRINT", a printing device name "PRINTER1" at an output destination is written.

FIG. 9 shows a description example of the deriving operation request 32*a*. In this example, the request is written in a skeleton representation in the XML format, and an element, an attribute, a name space, and the like other than necessary minimum are eliminated.

A derivation request (DerivationRequest) element 32*a*1 is an element associated with the entire deriving operation request 32*a*.

An action (Action) element 32*a*2 is an element indicative of a deriving operation action. In this example, a value of this element is a deriving operation action identifier. The deriving operation action identifier is identification information that enables unique identification of a deriving operation action.

A media type (MediaType) element 32*a*3 is an element indicative of a derivation destination media type. In this example, since the deviating operation action identifier which is the action (Action) element value semantically implies a derivation destination media type, an element value is empty. In this case, the element itself may be omitted.

An information resource (Resource) element 32*a*4 is an element indicative of an information resource identifier. In this example, an integer value is taken as a value for identification, but an information format including a search location such as a uniform resource identifier (URI) may be taken.

An output destination (OutputTo) element 32*a*5 is an element indicative of an output destination of a derived information resource. This element value is dependent on an action (Action) element value and, in this example, "PRINTER1" is designated as a printing device name at an output destination since the action (Action) element value is "PRINT". Furthermore, although description has been given as to the example where a deriving operation such as printing or replication is a target in this embodiment, elimination of an information resource and the like can be also targeted.

It is sufficient for an electronic text of the deriving operation request 32*a* transmitted from the deriving operation request transmission unit 32 to the deriving operation control device 40 to include at least one deriving operation request 32*a* depicted in FIG. 9.

Moreover, the deriving operation request transmission unit 32 may have a function for delivering notification of end of an operation received from the deriving operation control device 40 to the deriving operation request acceptance screen unit 31. Likewise, the deriving operation request acceptance screen unit 31 may have a function of displaying notification of end of an operation delivering from the deriving operation request transmission unit 32.

The deriving operation control device 40 is configured to execute and control a deriving operation for the derivation source information resource 10, and it is, e.g., a multi function printer (MFP). The derivation source information resource 10 may be managed by the deriving operation control device 40 or may be managed by an external resource management device as long as it can be read by the deriving operation control device 40.

As shown in FIG. 10, the deriving operation control device 40 comprises a storage unit 41, a deriving operation request reception unit 42, an entire control unit 43, an information resource access unit 44, an information resource derivation attribute acquisition unit 45, a derivation control information acquisition unit 46, a deriving operation propriety determination unit 47, a deriving operation execution unit 48, and a deriving operation result notification unit 49.

The storage unit 41 is a storage device readable/writable by the respective units 42 to 49, and it temporarily stores, e.g., information that is being processed.

The deriving operation request reception unit 42 is a functional unit configured to receive the deriving operation request 32*a* transmitted from the deriving operation request device 30. When the deriving operation request reception unit 42 receives the deriving operation request 32*a*, it interprets the deriving operation request 32*a* and hands over control to the entire control unit 43. It is to be noted that the deriving operation request reception unit 42 may have a function for transmitting to the deriving operation request device 30 notification of end of an operation that is similar to that of the deriving operation result notification unit 49. The transmitted notification of end of an operation may be supplied to the deriving operation request reception unit 42 from the deriving operation result notification unit 49 through the entire control unit 43.

The entire control unit 43 is a functional unit configured to control a sequence between the respective functional units 42 and 44 to 49 in the deriving operation control device 40. When the entire control unit 43 is not used, the respective functional units can perform call processing. Additionally, processing using the entire control unit 43 will be omitted in the following description to facilitate understanding.

The information resource access unit 44 is a functional unit configured to access the derivation source information resource 10 which is a deriving operation target. For example, the information resource access unit 44 has an information acquiring function for acquiring information from the derivation source information resource 10 indicated by an information resource identifier based on the information resource identifier of the derivation source information resource in a deriving operation request received from the deriving operation request device 30. It is sufficient for the information resource access unit 44 to have a regular electronic file read function when the derivation source information resource is an electronic information medium or to have a scanner function for reading an information resource identifier and information contents (a document main body) from a paper medium when the derivation source information resource is the paper medium, for example. Incidentally, when reading an information resource identifier from the above-described identification tag (an optical tag or an electronic tag), it is better to have a function for converting a read image of the optical tag read by the scanner function into character information or a wireless communicating function for reading the electronic tag, such as RFID.

It is to be noted that the derivation source information resource 10 may be stored in the deriving operation control device 40 or may be stored in an external device such as a database. Regardless of the location where this resource is stored, enabling reading of the derivation source information resource 10 by the information resource access unit 44 can suffice.

The information resource derivation attribute acquisition unit 45 is a functional unit that acquires the derivation attribute 23*a* given to the derivation source information resource 10. For example, the information resource derivation attribute acquisition unit 45 has a function for transmitting an "acquisition request including an information resource identifier of the derivation source information resource 10 and a media type of the derivation destination information resource" to the information resource derivation management device 20 based on a deriving operation request to acquire the derivation attribute 23*a* from the information resource derivation management device 20 in response to the acquisition request. As a supplementary note, the information resource derivation attribute acquisition unit 45 acquires the associated derivation attribute 23*a* by using the information resource identifier of the derivation source information resource 10 as a search key. However, the derivation attribute 23*a* may be managed by any device other than the information resource derivation management device 20. For example, when the derivation attribute 23*a* is provided in the derivation source information resource 10, the information resource derivation attribute acquisition unit 45 acquires the derivation attribute 23*a* from the derivation source information resource 10 through the information resource access unit 45.

The derivation control information acquisition unit 46 is a functional unit configured to acquire the derivation control information 22*a*. For example, like the information resource derivation attribute acquisition unit 45, the derivation control information acquisition unit 46 has a function for transmitting an "acquisition request including an information resource identifier of the derivation source information resource 10 and a media type of the derivation destination information resource 10*d*" to the information resource derivation management device 20 based on a deriving operation request to acquire the derivation control information 22*a* from the information resource derivation management device 20 in response to the acquisition request. As a supplementary note, the derivation control information acquisition unit 46 acquires the associated derivation control information 22*a* by using the information resource identifier of the derivation source information resource 10 or label information coordinated with, e.g., confidentiality as a search key. However, like the derivation attribute 23*a*, the derivation control information 22*a* may be managed by a device other than the information resource derivation management device 20.

The deriving operation propriety determination unit 47 compares each acquired derivation attribute 23*a* with the derivation control information 22*a* to determine whether a deriving operation requested in the deriving operation request 32*a* can be executed. For example, in the case of the deriving operation request 32*a* shown in FIG. 9, a deriving operation from an electronic information medium to a paper medium for an information resource identifier "0000000001" is requested. According to FIG. 7, since a media type of the information resource identifier "0000000001" is "DIGITAL" (an electronic information medium) and a generation is "1", an intersecting point of the media type "electronic information medium" of the derivation source information and the media type "paper medium" of the derivation destination information in the derivation control information 22*a* of the generation 1 is retrieved. As a result, since the upper limit number of times enabling derivation is "500", it can be understood that this number is acceptable as compared with the number of times of previously-performed derivation "1" of the paper medium with the information resource identifier "0000000001". Therefore, it can be determined that a deriving operation requested by the deriving operation request 32*a* can be executed.

As a supplementary note, the deriving operation propriety determination unit 47 has the following respective functions (f47-1) to (f47-3).

(f47-1) is a previously-performed derivation number extracting function for extracting the number of times of previously-performed derivation associated with a media type of a derivation destination information resource in the deriving operation request 32*a* in the numbers of times of previously-performed derivation of the derivation destination information resource for respective medial types in the acquired derivation attribute.

(f47-2) is an upper limit number extracting function for extracting the upper limit number of times enabling derivation associated with both a media type and a generation number in the acquired derivation attribute 23*a* and the media type of the derivation destination information resource in the deriving operation request 32*a* from the upper limit numbers of times enabling derivation of the derivation destination information resource for the respective media types associated with the generation number and the media type of the derivation source information resource in the acquired derivation control information 22*a.*

(f47-3) is a deriving operation determining function for determining that a deriving operation with respect to the deriving operation request 32*a* can be performed when the number of times of previously-performed derivation is not greater than the upper limit number of times enabling derivation based on the extracted number of times of previously-performed derivation and the upper limit number of times enabling derivation.

The deriving operation execution unit 48 is a functional unit configured to execute a deriving operation and generate a derivation destination information resource in response to a result determined by the deriving operation propriety determination unit 47 when the deriving operation propriety determination unit 47 determines that the deriving operation is possible. The generated derivation destination information resource may be directly output from the deriving operation execution unit 48 or may be output through the information resource access unit 44.

In the case of the direct output, it is sufficient for the deriving operation execution unit 48 to have a regular electronic file write function when the derivation destination information resource 10*d* is electronic information or have a printing function for printing an information resource identifier and information contents (a document main body) on a paper medium when the derivation destination information resource 10*d* is the paper medium, for example. It is to be noted that, when providing the paper medium with the above-described identification tag (the optical tag or the electronic tag), the deriving operation execution unit 48 can use the printing function in the case of the optical tag, but it must further include an electronic tag attaching function in the case of the electronic tag such as an RFID.

The deriving operation result notification unit 49 is a functional unit configured to notify the information resource derivation management device 20 of the deriving operation result 49*a* after end of the deriving operation performed by the deriving operation control device 40 as shown in FIG. 11.

FIG. 11 shows an example of the deriving operation result 49*a*. In this example, the result is written in the skeleton representation in the XML format, and an element or an attribute, a name space, and the like other than the necessary minimum are eliminated.

A derivation result (DerivationResult) element 49*a*1 is an element indicative of the deriving operation result 49*a*.

An action (Action) element 49*a*2 is an element indicative of an executed deriving operation action. In this example, a value of this element is determined as a deriving operation action identifier.

A media type (MediaType) element 49*a*3 is an element indicative of a derivation destination media type. In this example, since a deriving operation action identifier which is the action (Action) element value semantically implies a derivation destination media type, an element value is empty. In this case, the element itself may be omitted.

A derivation source resource (Source) element 49*a*4 is an element indicative of a derivation source information resource 10.

A derivation destination (Destination) element 49*a*5 is an element indicative of a derivation destination information resource. It is sufficient for an electronic text of the deriving operation result 49*a* transmitted from the deriving operation result notification unit 49 to the information resource derivation management device 20 to include at least one deriving operation result 49*a* depicted in FIG. 11.

Figure 12:
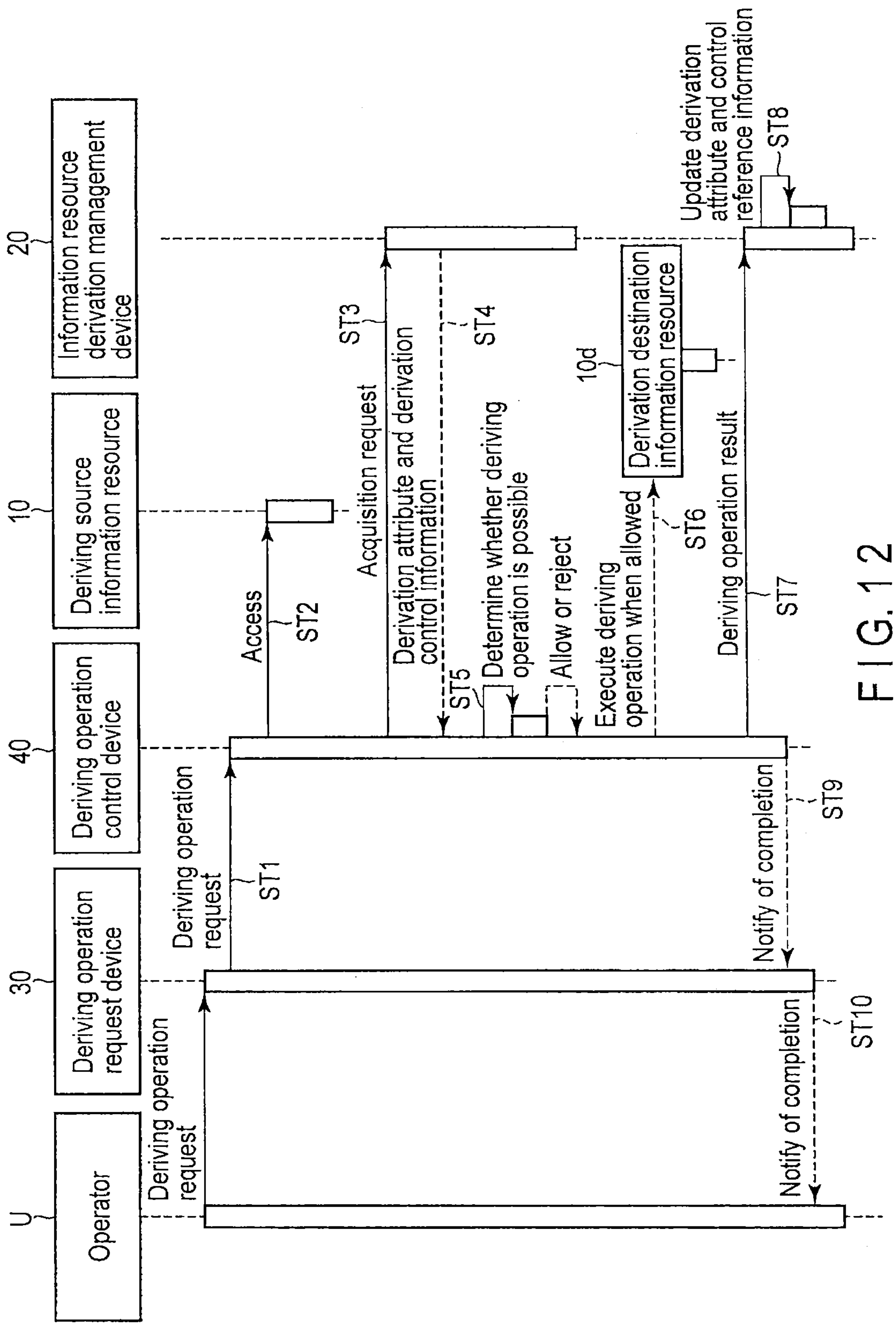
FIG. 12 is a view for explaining an operation in the first embodiment.
Figure 24:
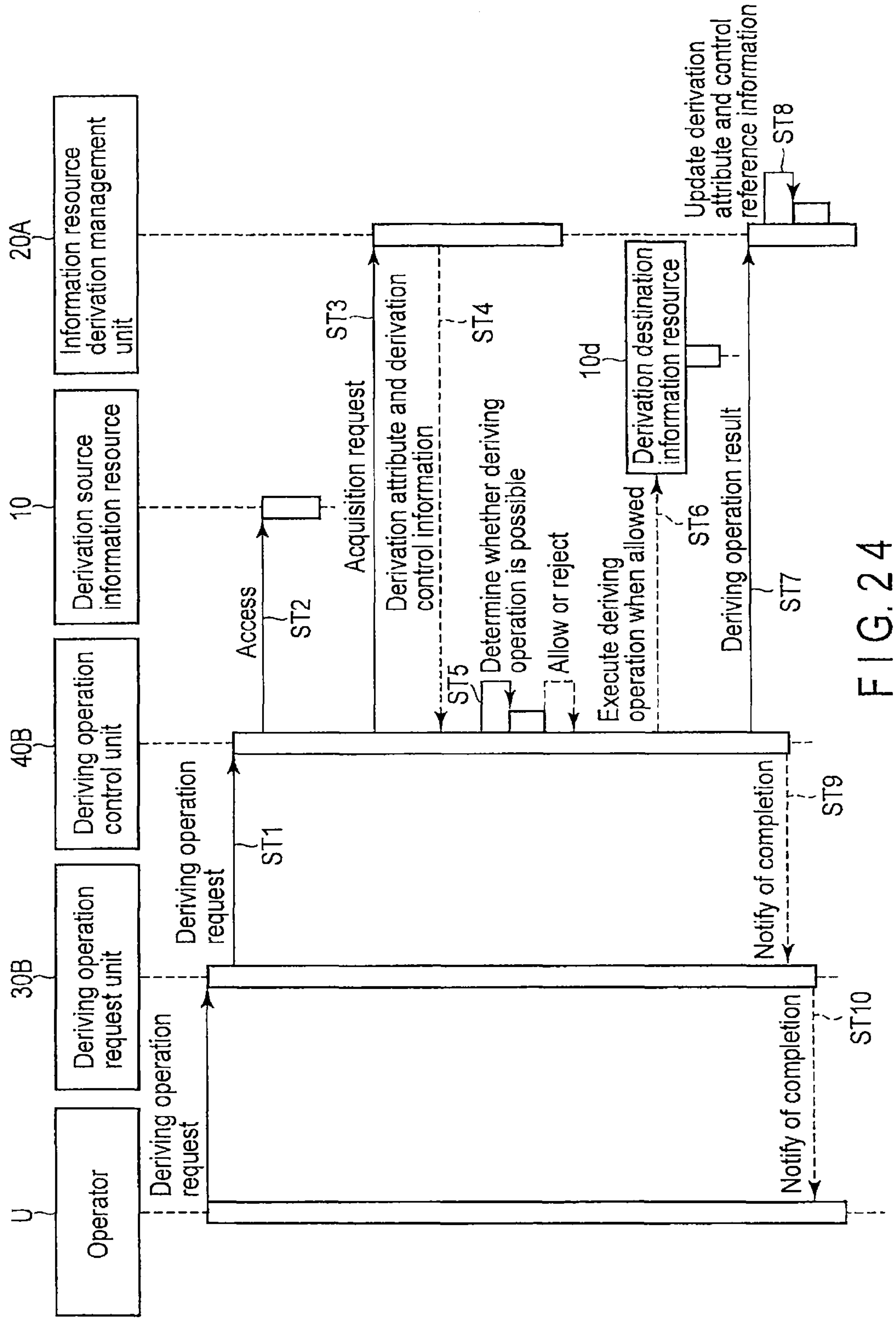
FIG. 24 is a view for explaining an operation in the fifth embodiment.

An operation of the thus configured access control system will now be described with reference to a sequence chart of FIG. 12. Here, description will be given as to an example where the information resource derivation management device 20 manages the derivation attribute 23*a*.

(ST1) In the deriving operation request device 30, the deriving operation request acceptance screen unit 31 accepts input of the deriving operation request 32*a* including an information resource identifier of a derivation source information resource, a deriving operation action identifier, and a media type of a derivation destination information resource by an operation of an operator.

The deriving operation request transmission unit 32 transmits a deriving operation request 32*a* accepted by the deriving operation request acceptance screen unit 31 to the deriving operation control device 40.

(ST2) In the deriving operation control device 40, the deriving operation request reception unit 42 receives the deriving operation request 32 and writes it into the storage unit 41. The information resource access unit 44 accesses the derivation source information resource 10 indicated by this information resource identifier to acquire information from the derivation source information resource 10 based on the information resource identifier in the deriving operation request stored in the storage unit 41.

(ST3) Then, in the deriving operation control device 40, the information resource derivation attribute acquisition unit 45 transmits a derivation attribute acquisition request including the information resource identifier of the derivation source information resource 10 and the media type of the derivation destination information resource 10*d* to the information resource derivation management device 20. Likewise, the derivation control information acquisition unit 46 transmits a derivation control information acquisition request including the information resource identifier of the derivation source information resource 10 and the media type of the derivation destination information resource 10*d* to the information resource derivation management device 20.

(ST4) Upon receiving the acquisition requests for the derivation attribute 23*a* and the derivation control information 22*a*, the information resource derivation management device 20 determines the corresponding derivation attribute 23*a* and derivation control information 22 and transmits them to the deriving operation control device 40.

In more detail, in the information resource derivation management device 20, when the derivation control information determination unit 25 receives the acquisition requests, it replicates derivation control source data and writes the derivation control information 22*a* into the derivation control information storage unit 22.

Further, the derivation control information determination unit 25 searches for the derivation attribute 23*a* in the derivation attribute storage unit 23 based on the information resource identifier in the acquisition request and totalizes the numbers of times of previously-performed derivation for respective media types in the obtained derivation attribute 23*a*, thereby obtaining a total value.

Subsequently, the derivation control information determination unit 25 calculates an abundance ratio of each media type indicative of a physical medium based on this total value and the number of times of previously-performed derivation of the media type indicative of the physical medium in the media types in the derivation attribute 23*a* obtained by the search, thereby obtaining a calculated value.

Furthermore, the derivation control information determination unit 25 updates a calculated value in the control reference information 21*a* to the calculated value obtained by this calculation, then determines whether the calculated value is not smaller than an upper limit value in the control reference information 21*a*, and updates the upper limit number of times enabling derivation of the derivation control information 22*a* in the derivation control information storage unit 22 to a zero value when the calculated value is not smaller than the upper limit value as a result of the determination. When the calculated value is less than the upper limit value, the upper limit number of times enabling derivation is maintained as it is. As a result, the derivation attribute 23*a* and the derivation control information 22*a* associated with the acquisition requests are determined.

Subsequently, the derivation control information transmission unit 26 transmits the derivation control information 22*a* in the derivation control information storage unit 22 to the deriving operation control device 40. Likewise, the information resource derivation attribute transmission unit 27 transmits the derivation attribute 23*a* in the derivation attribute storage unit 23 to the deriving operation control device 40.

(ST5) In the deriving operation control device 40, the derivation attribute acquisition unit 44 writes the obtained derivation attribute 23*a* into the storage unit 41. Likewise, the derivation control information acquisition unit 46 writes the acquired derivation control information 22*a* into the storage unit 41.

Then, in the deriving operation control device 40, the deriving operation propriety determination unit 47 compares the derivation attribute 23*a* acquired in the storage unit 41 with the derivation control information 22*a* to determine whether the deriving operation can be performed.

In more detail, the deriving operation propriety determination unit 47 extracts the number of times of previously-performed derivation associated with a media type of the derivation destination information resource in the deriving operation request 32*a* from the numbers of times of previously-performed derivation of the derivation destination information resource for the respective media types in the acquired derivation attribute.

Further, the deriving operation propriety determination unit 47 extracts the upper limit number of times enabling derivation associated with both the media type and the generation number in the acquired derivation attribute 23*a* and the media type of the derivation destination information resource in the deriving operation request 32*a* from the upper limit numbers of times enabling derivation of the derivation destination information resource for the respective media types associated with the generation number and the media type of the derivation source information resource in the acquired derivation control information 22*a*.

Furthermore, based on the extracted number of times of previously-performed derivation and the extracted upper limit number of times enabling derivation, the deriving operation propriety determination unit 47 determines that the deriving operation can be performed with respect to the deriving operation request 32*a* when the number of times of previously-performed derivation is equal to or below the upper limit number of times enabling derivation (allowing). It is to be noted that, when the number of times of previously-performed derivation exceeds the upper limit number of times enabling derivation, it is determined that the deriving operation cannot be performed with respect to the deriving operation request 32*a* (rejecting).

(ST6) In the deriving operation control device 40, the deriving operation execution unit 48 executes the deriving operation based on a result of determining whether the deriving operation can be performed. That is, when the deriving operation is allowed, the deriving operation execution unit 48 executes the deriving operation. Moreover, when the deriving operation is rejected, the deriving operation execution unit 48 does not execute the deriving operation.

(ST7) In the deriving operation control device 40, when the execution of the deriving operation is terminated, the deriving operation result notification unit 49 transmits the deriving operation result 49*a* to the information resource derivation management device 20.

(ST8) In the information resource derivation management device 20, the information resource management unit 24 updates the control reference information 21*a* and the derivation attribute 23*a* based on the deriving operation result 49*a*.

In detail, when the information resource management unit 24 receives the deriving operation result including the information resource identifier of the derivation source information resource, the information resource identifier of the derivation destination information resource, and the media type of the derivation destination information resource from the deriving operation control device 40, it updates the number of times of previously-performed derivation based on the information resource identifier of the derivation source information resource and the media type of the derivation destination information resource in the deriving operation result.

Moreover, the information resource management unit 24 writes the new derivation attribute 23*a* including the media type, the generation number, and the information resource identifier of the derivation source information resource into the derivation attribute storage unit 23 in association with the information resource identifier of the derivation destination information resource in the deriving operation result.

Additionally, the information resource management unit 24 updates the calculated value of the abundance ratio in the control reference information 21*a* to a zero value.

(ST9) The deriving operation control device 40 notifies the deriving operation request device 30 of termination of the operation.

(ST10) The deriving operation request device 30 notifies the operator of the termination of the operation by displaying the termination of the operation.

As described above, according to this embodiment, the upper limit number of times enabling derivation in the derivation control information 22*a* is updated to a zero value when the calculated value of the abundance ratio based on the number of times of previously-performed derivation (23*a*6) for each media type in the derivation attribute 23*a* is equal to or above the upper limit value of the abundance ratio in the derivation reference information 21*a*, and the deriving operation is executed when the number of times of previously-performed derivation does not exceed this upper limit number of times enabling derivation, whereby the abundance ratio of the media type can be controlled while managing the total number of pieces of information to be derived in accordance with each media type at the time of controlling access for deriving the information.

As a supplementary note, for example, since a real company deals with not only electronic information but also information in media which are of various media types, management of a total number of pieces of replicated information is difficult, and inconvenience such as leakage or damage of important information is apt to occur.

On the other hand, since the conventional technology assumes application in a specific media type such as electronic information only, replication control when distributing information in various media types is not performed, and managing a total number of pieces of information is difficult. For example, in the case of contract information with a general consumer, an original text of the contract information is processed as a paper medium, and it is often read into an information system as electronic information from the paper medium of the original text. Additionally, the paper medium of the original text or the contract information as the read electronic information may be replicated to a paper medium as a part of business processing.

In this manner, when information in a medium which is of a specific media type is replicated (which will be referred to as derivation hereinafter) to an information group of the same media type or a different media type, it is assumed that managing a total number (a total amount) of pieces of information to be derived in accordance with each media type is important.

Further, from the aspect of management, an abundance ratio of a media type, for example, 60% for the paper medium, is an important index. That is because a management cost and an environment cost associated with the abundance ratio differ depending on each media type. For example, in the case of the paper medium, the management cost and the environment cost such as a resource at the time of printing, physical management measures, a resource at the time of disposal, and others increase in accordance with the abundance ratio of the paper medium. On the other hand, when deriving electronic information to be written into an existing storage device, the management cost and the environment cost hardly increase even though the abundance ratio of the electronic information grows. Therefore, from the aspect of management, there is a demand of limiting derivation of information to a media type having a high management cost and environment cost to a predetermined abundance ratio or a lower ratio. It is to be noted that, if access control for derivation of information can be realized in accordance with each media type, an abundance ratio for each media type can be limited.

In short, in a real company, when using media types to derive information, it is desirable to enable controlling an abundance ratio of each media type while managing a total number of pieces of information to be derived in accordance with each media type.

On the other hand, according to this embodiment, as described above, when controlling access for deriving information, an abundance ratio of each media type can be controlled while managing a total number of pieces of information to be derived in accordance with each media type.

Furthermore, in this embodiment, in the case of application to an information life cycle management for managing generation/derivation/disuse of information, in addition to the advantage of the information life cycle management, it is possible to explicitly manage a media type that can be taken by the derivation destination information resource 10*d* by the derivation control information 22*a* and realize access control associated with an external dynamic control element, e.g., an abundance ratio of each media type by the derivation reference information 21*a* at an operating point concerning generation/derivation of information even though it is information generated or derived in various media types.

It is to be noted that, when applying this embodiment to the information life cycle management is desired, this embodiment can be modified so that the information life cycle management is enabled by incorporating this embodiment in an existing information life cycle management system to be carried out simultaneously with the information life cycle management or by using the derivation attribute 23*a* to manage information required for the information life cycle management, such as information to be disused, for example.

Moreover, in this embodiment, when grasping details about derivation of information is desired, it is possible to retroactively grasp the details about derivation of information by using a search result to repeatedly execute processing of extracting a parent element in a derivation attribute associated with an information resource identifier and processing of searching for an information resource identifier of the parent based on extracted parent information.

Second Embodiment

FIG. 13 is a schematic view showing a configuration of an access control system according to a second embodiment, like reference numerals denote parts equal to those in the above-descried drawings to omit a detailed description thereof, and different parts will be mainly described here. It is to be noted that any overlapping explanation will be likewise omitted in the following respective embodiments.

The second embodiment is a modification of the first embodiment, and the deriving operation propriety determination processing assigned to the deriving operation control device 40 according to the first embodiment is assigned to an information resource derivation device 20'.

At the same time, as indicated by broken lines L1 and L2 in FIG. 13, a deriving operation control device 40' has a configuration obtained by omitting the deriving operation propriety determination unit 47, the information resource derivation attribute acquisition unit 45, and the derivation control information acquisition unit 46 from the functional configuration of the deriving operation control device 40 described in the first embodiment and adding a deriving operation propriety determination request unit 47'. At the same time, in an entire control unit 43', a function for controlling the omitted functional units 45 to 47 is omitted, and a function for controlling the added functional unit 47' is added.

The deriving operation propriety determination request unit 47' is a functional unit for requesting an information resource derivation management device 20 to determine whether a deriving operation execution unit 48 can execute a deriving operation.

As indicated by a broken line L3 in FIG. 14, the information resource derivation management device 20' has a configuration obtained by omitting the derivation control information transmission unit 26 and the information resource derivation attribute transmission unit 27 from the functional configuration of the information resource derivation management device 20 described in the first embodiment and adding a deriving operation propriety determination unit 28 and a deriving operation propriety determination transmission unit 29. The deriving operation propriety determination unit 28 is a functional unit for executing the same operation as that of the deriving operation propriety determination unit 47 according to the first embodiment.

The deriving operation propriety determination transmission unit 29 is a functional unit for transmitting to the deriving operation control device 40' a result of determining whether a deriving operation can be performed in response to a deriving operation propriety determination request from the deriving operation control device 40'.

An operation of the thus configured access control system will now be described with reference to a sequence diagram of FIG. 15.

The access control system executes the above-described steps ST1 to ST2.

(ST3') In the deriving operation control device 40', the deriving operation propriety determination request unit 47' transmits a deriving operation propriety determination request including an information resource identifier of a derivation source information resource 10 and a media type of a derivation destination information resource 10*d* to the information resource derivation management device 20'.

(ST4') Upon receiving the deriving operation propriety determination request, the information resource derivation management device 20' determines a corresponding derivation attribute 23*a* and derivation control information 22*a* and transmits them to the deriving operation control device 40'.

In more detail, in the information resource derivation management device 20', upon receiving the deriving operation propriety determination request, a derivation control information determination unit 25 replicates derivation control source data and writes the derivation control information 22*a* into a derivation control information storage unit 22.

Further, the derivation control information determination unit 25 searches for the derivation attribute 23*a* in a derivation attribute storage unit 23 based on the information resource identifier in the deriving operation propriety determination request and totalizes the numbers of times of previously-performed derivation for respective media types in the obtained derivation attributes 23*a*, thereby acquiring a total value.

Subsequently, the derivation control information determination unit 25 calculates an abundance ratio of a media type indicative of a physical medium based on this total value and the number of times of previously-performed derivation of the media type indicative of the physical medium in the media types in the derivation attribute 23*a* obtained by search, thus obtaining a calculated value.

Furthermore, the derivation control information determination unit 25 updates a calculated value in control reference information 21*a* to the calculated value obtained by this calculation, then determines whether the calculated value is equal to or above an upper limit value in the control reference information 21*a*, and updates an upper limit number of times enabling derivation of the derivation control information 22*a* in the derivation control information storage unit 22 to a zero value when the calculated value is equal to or above the upper limit value as a result of the determination. When the calculated value is less than the upper limit value, the upper limit number of times enabling derivation is maintained as it is. As a result, the derivation attribute 23*a* and the derivation control information 22*a* associated with the deriving operation propriety determination request are determined.

Then, the derivation control information determination unit 25 delivers the derivation control information 22*a* in the derivation control information storage unit 22 and the derivation attribute 23*a* in the derivation attribute storage unit 23 to the deriving operation propriety determination unit 28.

(ST5') The deriving operation propriety determination unit 28 determines whether the deriving operation can be performed based on the derivation attribute 23*a* and the derivation control information 22*a* delivered thereto and transmits a result to the deriving operation control device 40' through the deriving operation propriety determination transmission unit 29.

In detail, the deriving operation propriety determination unit 47 extracts the number of times of previously-performed derivation associated with the media type of the derivation destination information resource in the deriving operation request 32*a* from the numbers of times of previously-performed derivation of the derivation destination information resource for respective media types in the delivered derivation attribute.

Moreover, the deriving operation propriety determination unit 47 extracts the upper limit numbers of times enabling derivation associated with both the media type and the generation number in the delivered derivation attribute 23*a* and the media type of the derivation destination information resource in the deriving operation request 32*a* from the upper limit numbers of times enabling derivation of the derivation destination information resource for the respective media types associated with the generation number and the media type of the derivation source information resource in the delivered derivation control information 22*a*.

Additionally, based on the extracted number of times of previously-performed derivation and the extracted upper limit number of times enabling derivation, the deriving operation propriety determination unit 47 determines that the deriving operation can be performed with respect to the deriving operation request 32*a* when the number of times of previously-performed derivation is equal to or below the upper limit number of times enabling derivation (allowing). It is to be noted that, when the number of times of previously-performed derivation exceeds the upper limit number of times enabling derivation, it is determined that the deriving operation cannot be performed with respect to the deriving operation request 32*a* (rejecting).

Then, the deriving operation propriety determination unit 47 delivers a result of determining whether the deriving operation can be performed to the deriving operation propriety determination transmission unit 29.

The deriving operation propriety determination transmission unit 29 transmits the delivered determination result to the deriving operation control device 40'.

Thereafter, processing of the step ST6 and subsequent steps will be executed.

As described above, according to this embodiment, even if the configuration that the information resource management device 20' determines whether the deriving operation can be effected is adopted, the same effect as that of the first embodiment can be obtained.

Third Embodiment

FIG. 16 is a schematic view showing a functional configuration of a deriving operation control device according to a third embodiment.

The third embodiment is a modification of the first embodiment and is a conformation in which the information resource derivation management device 20 and the deriving operation control device 40 in the first embodiment are integrated and, specifically, a deriving operation control device 50 comprises an information resource derivation management unit 20A having the same function as that of the information resource derivation management device 20 and a deriving operation control unit 40A having the same function as that of the deriving operation control device 40 in place of the information resource derivation management device 20 and the deriving operation control device 40.

At the same time, as indicated by a broken line L4 in FIG. 17, the information resource derivation management unit 20A is configured to include a derivation control information delivery unit 26A and an information resource attribute delivery unit 27A in place of the derivation control information transmission unit 26 and the information resource attribute transmission unit 27 described in the first embodiment.

The respective delivery units 26A and 27A have a delivery function in the device 50 rather than a transmitting function in a network, and hence they are functional units obtained by changing "transmission" of the respective transmission units 26 and 27 to "delivery".

That is, the derivation control information delivery unit 26A is a functional unit for delivering derivation control information 22*a* determined by a derivation control information determination unit 25 to the deriving operation control unit 40A with respect to an acquisition request for the derivation control information 22*a* from the deriving operation control unit 40A.

The information resource derivation attribute delivery unit 27A is a functional unit for delivering a derivation attribute 23*a* in a derivation attribute storage unit 23 to the deriving operation control unit 40A in response to an acquisition request for the derivation attribute 23*a* from the deriving operation control unit 40A.

It is to be noted that an information resource derivation attribute acquisition unit 45, a derivation control information acquisition unit 46, and a deriving operation result notification unit 49 likewise have a data transmitting/receiving function in the device 50 rather than a communicating function in the network.

That is, the information resource derivation attribute acquisition unit 45 has a function for acquiring the derivation attribute 23*a* from the information resource derivation management unit 20A in response to an acquisition request by delivering the "acquisition request including an information resource identifier of a derivation source information resource 10 and a media type of a derivation destination information resource 10*d*" to the information resource derivation management unit 20A based on a deriving operation request.

The derivation control information acquisition unit 46 has a function for acquiring the derivation control information 22*a* from the information resource derivation management unit 20A in response to an acquisition request by delivering the "acquisition request including an information resource identifier of the derivation source information resource 10 and a media type of the derivation destination information resource 10*d*" to the information resource derivation management unit 20A based on a deriving operation request.

The deriving operation result notification unit 49 is a functional unit configured to notify the information resource derivation management unit 20A of a deriving operation result 49*a* after end of the deriving operation performed by the deriving operation control unit 40A.

According to the above-described configuration, even the conformation that the deriving operation control device 50 comprises the information resource derivation management unit 20A having the same function as that of the information resource derivation management device 20 and the deriving operation control unit 40A having the same function as that of the deriving operation control device 40 enables executing the same operation as that in the first embodiment as shown in FIG. 18, thereby obtaining the same effect.

Fourth Embodiment

FIG. 19 is a schematic view showing a functional configuration of a deriving operation control device according to a fourth embodiment.

The fourth embodiment is a modification of the second embodiment, which is a conformation that the information resource derivation management device 20' and the deriving operation control device 40' in the second embodiment, are integrated and, specifically, a deriving operation control device 50' comprises an information resource derivation management unit 20A' having the same function as that of the information resource derivation management device 20' and a deriving operation control unit 40A' having the same function as that of the deriving operation control device 40' in place of the information resource derivation management device 20' and the deriving operation control device 40'.

At the same time, as indicated by a broken line L5 in FIG. 20, the information resource derivation management unit 20A is configured to include a deriving operation propriety determination delivery unit 29A' in place of the deriving operation propriety determination transmission unit 29 described in the second embodiment.

The deriving operation propriety determination delivery unit 29A' has a delivery function in the device 50' rather than a transmitting function in a network, and hence it is a functional unit obtained by changing "transmission" of the deriving operation propriety determination transmission unit 29 to "delivery". That is, the deriving operation propriety determination delivery unit 29A' is a functional unit for delivery a result of determining whether a deriving operation can be performed to the deriving operation control unit 40A' in response to a deriving operation propriety determination request from the deriving operation control unit 40A'.

It is to be noted that a deriving operation propriety determination request unit 47' and a deriving operation result notification unit 49 likewise have a data transmitting/receiving function in the device 50' rather than a communicating function in the network.

According to the above-described configuration, even the conformation that the deriving operation control device 50' comprises the information resource derivation management unit 20A' having the same function as that of the information resource derivation management device 20' and the deriving operation control unit 40A' having the same function as that of the deriving operation control device 40' enables executing the same operation as that of the second embodiment, thereby obtaining the same effect.

Fifth Embodiment

FIG. 22 is a schematic view showing a functional configuration of a deriving operation control device according to a fifth embodiment.

The fifth embodiment is a modification of the first and third embodiments, which is a conformation that the deriving operation request device 30 in the first and third embodiments and the deriving operation control device 50 in the third embodiment are integrated and, specifically, a deriving operation control device 51 comprises a deriving operation request unit 30B having the same function as that of the deriving operation request device 30, a deriving operation control unit 40B having the same function as that of the deriving operation control device 50, and an information resource management unit 20A.

At the same time, as indicated by a broken line L3 in FIG. 22, the deriving operation control unit 40B is configured to include a deriving operation request acceptance unit 42B in place of the deriving operation request reception unit 42 described in the first embodiment. The deriving operation request acceptance unit 42B has an accepting function in the device 50 rather than a receiving function in a network, and hence it is a functional unit obtained by changing "reception" of the deriving operation request reception unit 42 to "acceptance".

Likewise, as indicated by a broken line L7 in FIG. 23, the deriving operation request unit 30B is configured to include a deriving operation request transmission unit 32B in place of the deriving operation request transmission unit 32 described in the first embodiment.

The deriving operation request transmission unit 32B has a delivery function in the device 51 rather than a transmitting function in the network, and hence it is a functional unit obtained by changing "transmission" of the deriving operation request transmission unit 32B to "delivery".

That is, the deriving operation request delivery unit 32 is a functional unit for delivering a deriving operation request 32*a* accepted by a deriving operation request acceptance screen unit 31 to the deriving operation control unit 40B.

According to the above-described configuration, even the conformation that the deriving operation control device 51 comprises the deriving operation request unit 30B having the same function as that of the deriving operation request device 30, the deriving operation control unit 40B having the same function as that of the deriving operation control device 50, and the information resource management unit 20A enables executing the same operation as those of the first and third embodiment, thereby obtaining the same effect.

Sixth Embodiment

FIG. 25 is a schematic view showing a functional configuration of a deriving operation control device according to a sixth embodiment.

The sixth embodiment is a modification of the second and fourth embodiments, which is a conformation that the deriving operation request device 30 according to the second and fourth embodiments and the deriving operation control device 50' according to the fourth embodiment are integrated and, specifically, a deriving operation control device 51' comprises a deriving operation request unit 30B having the same function as that of the deriving operation request device 30, a deriving operation control unit 40B' having the same function as that of the deriving operation control device 50', and an information resource management unit 20A' in place of the deriving operation request device 30 and the deriving operation control device 50'.

At the same time, a deriving operation control device 51 is configured to include the deriving operation request unit 30 and a deriving operation request acceptance unit 42B equal to those in the fifth embodiment.

According to the above-described configuration, even a conformation that the deriving operation control device 51' comprises the deriving operation request unit 30B having the same function as that of the deriving operation request device 30, the deriving operation control unit 40B' having the same function as that of the deriving operation control device 50', and the information resource management unit 20A' enables executing the same operation as those in the second and fourth embodiments, thereby obtaining the same effect.

Further, in each of the foregoing embodiments, when information is distributed regardless the various media types, replication control can be performed in accordance with each media type.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

It is to be noted that the present invention is not restricted to the foregoing embodiments as it is, and constituent elements can be modified and carried out in the embodying stage without departing from the gist of the invention. Furthermore, various modifications can be formed by appropriately combining a plurality of constituent elements disclosed in the foregoing embodiments. For example, some constituent elements may be deleted from all the constituent elements disclosed in embodiments. Moreover, constituent elements in different embodiments may be appropriately combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information resource derivation management device comprising:

a derivation control information storage unit which stores derivation control information obtained by replicating derivation control source data in which an upper limit number of times enabling derivation of a derivation destination information resource for each media type is previously written in accordance with a generation number and a generation number and a media type of a derivation source information resource;

a control reference information storage unit which stores control reference information including an upper limit value of an abundance ratio of a media type and a calculated value of the abundance ratio in accordance with the media type, the calculated value being updatable;

a derivation attribute storage unit which stores a derivation attribute for an information resource identifier, the derivation attribute including a media type, a generation number, and an information resource identifier of the derivation source information resource, and further including a number of times of previously-performed derivation of the derivation destination information resource for each media type when derived information is present;

a unit which replicates the derivation control source data and writes derivation control information in the derivation control information storage unit upon receiving an acquisition request including the information resource identifier of the derivation source information resource and the media type of the derivation destination information resource;

a derivation attribute searching unit which searches for a derivation attribute in the derivation attribute storage unit based on the information resource identifier in the acquisition request;

a previously-performed derivation number totalizing unit which totalizes a number of times of previously-performed derivation for the respective media types in the derivation attribute obtained by the search, thereby acquiring a total value;

an abundance ratio calculating unit which calculates an abundance ratio of a media type indicative of a physical medium based on the total value and the number of times of previously-performed derivation of the medial type indicative of the physical medium in the media types in the derivation attribute obtained by search, thereby acquiring a calculated value;

an updating unit which updates a calculated value in the control reference information to the calculated value obtained by the calculation;

a control reference determination unit which determines whether the calculated value is equal to or above an upper limit value in the control reference information after updating the calculated value;

an upper limit number updating unit which updates the upper limit number of times enabling derivation of the derivation control information in the derivation control information storage unit to a zero value when the calculated value is equal to or above the upper limit value as a result of the determination;

a transmission unit which transmits the derivation control information in the derivation control information storage unit and the derivation attribute obtained by the search in response to the acquisition request when updated to the zero value or when the result of the determination is negative;

a previously-performed derivation number updating unit which updates the number of times of previously-performed derivation based on the information resource identifier of the derivation source information resource and the media type of the derivation destination information resource in a deriving operation result upon receiving the deriving operation result including the information resource identifier of the derivation source information resource, the information resource identifier of the derivation destination information resource, and the media type of the derivation destination information resource after end of the deriving operation; and a derivation attribute writing unit which writes a new derivation attribute including the media type, the generation number, and the information resource identifier of the derivation source information resource into the derivation attribute storage unit in association with the information resource identifier of the derivation destination information resource in the deriving operation result.

* * * * *